United States Patent
Sandlin et al.

(10) Patent No.: US 11,612,163 B2
(45) Date of Patent: *Mar. 28, 2023

(54) STABILIZATION OF WHOLE BLOOD SAMPLES

(71) Applicant: The General Hospital Corporation, Boston, MA (US)

(72) Inventors: Rebecca Sandlin, Charlestown, MA (US); Keith Wong, Newton, MA (US); Shannon Tessier, Framingham, MA (US); Mehmet Toner, Charlestown, MA (US); Shannon Stott, Stoneham, MA (US)

(73) Assignee: The General Hospital Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,528

(22) Filed: Jul. 23, 2020

(65) Prior Publication Data

US 2021/0007348 A1 Jan. 14, 2021

Related U.S. Application Data

(63) Continuation of application No. 15/502,261, filed as application No. PCT/US2015/043269 on Jul. 31, 2015, now Pat. No. 10,750,739.

(60) Provisional application No. 62/037,632, filed on Aug. 15, 2014, provisional application No. 62/034,481, filed on Aug. 7, 2014.

(51) Int. Cl.
*A01N 1/02* (2006.01)

(52) U.S. Cl.
CPC ......... *A01N 1/0221* (2013.01); *A01N 1/0231* (2013.01); *A01N 1/0278* (2013.01)

(58) Field of Classification Search
CPC ... A01N 1/0221; A01N 1/0231; A01N 1/0278
See application file for complete search history.

(56) References Cited

U.S. PATENT DOCUMENTS

| 6,020,120 | A | 2/2000 | Sharvata |
|---|---|---|---|
| 7,811,558 | B2 | 10/2010 | Ho et al. |
| 2004/0038997 | A1 | 2/2004 | Macey |
| 2005/0214877 | A1 | 9/2005 | Wyant et al. |
| 2010/0069326 | A1 | 3/2010 | Haque et al. |
| 2011/0027771 | A1 | 2/2011 | Deng |
| 2014/0004046 | A1 | 1/2014 | Raghunath et al. |

FOREIGN PATENT DOCUMENTS

| CN | 103827302 A | 5/2014 |
|---|---|---|
| JP | 2004-513369 | 4/2004 |
| JP | 2008/509924 | 4/2008 |
| JP | A-2012-526849 | 11/2012 |
| WO | WO 02/039124 | 5/2002 |
| WO | WO 02/49653 | 6/2002 |
| WO | WO 2006/076401 | 7/2006 |
| WO | WO 2011/014741 | 2/2011 |
| WO | WO 2012/024693 | 2/2012 |
| WO | WO 2013/045458 | 4/2013 |
| WO | WO 2014/059316 | 4/2014 |

OTHER PUBLICATIONS

AU Office Action in Australian Appln. No. 2015301303 dated Sep. 28, 2020, 4 pages.
JP Office Action in Japanese Appln. No. 2020-066388, dated Mar. 23, 2021, 10 pages (with English translation).
Afonso et al., "Critical parameters in blood processing fort-cell assays: validation on elispot and tetramer platforms," J Immunol Methods, 2010, 359(1-2):28-36.
Armstrong et al., "The hydrodynamic radii of macromolecules and their effect on red blood cell aggregation," Biophys. J, Dec. 2004, 87(6):4259-70.
Arrington and McNamara, "Effect of agitation on platelet aggregation and microaggregate formation in banked blood," Ann. Surg., 1975, 181 (2):243-44.
Bergan et al., "Low molecular weight dextran in treatment of severe ischemia," Arch. Surg., 1965, 91(2):338.
Brill et al., "Neutrophil extracellular traps promote deep vein thrombosis in mice," J Thromb. Haemost., 2012, 10(1):136-44.
Brinkmann and Zychlinsky, "Neutrophil extracellular traps: is immunity the second function of chromatin?," J Cell Biol., 2012, 198(5):773-83.
Brown et al., "Morphological, biochemical, and functional changes in human platelets subjected to shear stress," J Lab. Clin. Med., 1975, 86(3):462-71.
Cheng et al., "A microfluidic device for practical label-free CD4(+) t cell counting of HIV-infected subjects," Lab Chip, Feb. 2007, 7(2): 170-78.
Chien et al., "Blood viscosity: influence of erythrocyte aggregation," Science, Aug. 1967, 157 (3790): 829-31.
Chinese Office Action in Application No. 201580054390.3, dated Mar. 19, 2018, 8 pages (with English translation).
De Rose et al., "Granulocyte contamination dramatically inhibits spot formation in aids virus-specific elispot assays: analysis and strategies to ameliorate," J Immunol Methods, 2005, 297(1-2): 177-86.
Extended European Search Report in Application No. 15829066.8, dated Mar. 5, 2018, 10 pages.
Fuchs et al., "Neutrophils release extracellular DNA traps during storage of red blood cell units," Transfusion, 2013, 53(12):3210-16.
Fuchs et al., "Novel cell death program leads to neutrophil extracellular traps," J Cell Biol., Jan. 2007, 176(2):231-41.
Garcia-Romo et al., "Netting neutrophils are major inducers of type i ifn production in pediatric systemic lupus erythematosus," Sci. Transl. Med., Mar. 2011, 3(73):73ra20.
GE Healthcare, Data File 18-1158-27 AB, Cell preparation, 2007, p. 1-6.
Gervin et al., "The effect of agitation of stored human blood on microaggregate formation," Transfusion, Jan. 1978, 18(1):73-78.

(Continued)

*Primary Examiner* — Kade Ariani
(74) *Attorney, Agent, or Firm* — Fish & Richardson P.C.

(57) ABSTRACT

Methods for stabilizing blood samples, e.g., clinical blood samples, for storage or transportation before use.

12 Claims, 22 Drawing Sheets

(56) References Cited

OTHER PUBLICATIONS

Hardwick, "Blood processing," ISBT Sci. Ser., 2008, 3:148-76.
Huang et al., "A microfluidics approach for the isolation of nucleated red blood cells (NRBCs) from the peripheral blood of pregnant women," Prenat Diagn, Oct. 2008, 28(10):892-99.
Huestis and Glasser, "The neutrophil in transfusion medicine," Transfusion., Jul. 1994, 34(7):630-46.
International Preliminary Report on Patentability in International Application No. PCT/US2015/043269, dated Feb. 7, 2017.
International Search Report and Written Opinion dated Oct. 26, 2015 in International Application No. PCT/US15/43269, 22 pgs.
Jan et al., "The disaggregation effect of dextran 40 on red cell aggregation in macromolecular suspensions," Biorheology, 1982, 19(4):543-54.
Karabacak et al., "Microfluidic, marker-free isolation of circulating tumor cells from blood samples," Nat Protoc, Mar. 2014, 9(3):694-710.
Klopfleisch et al., "Excavation of a buried treasure—DNA, mRNA, miRNA and protein analysis in formalin fixed, paraffin embedded tissues," Histol Histopathol, 2011, 26(6):797-810.
Kotz et al., "Clinical microfluidics for neutrophil genomics and proteomics," Nat. Med., Sep. 2010, 16(9): 1042-47.
Lowe, "Blood rheology in vitro and in vivo," Baillieres. Clin. Haematol., 1987, 1(3):597-636.
Maheswaran et al., "Detection of mutations in egfr in circulating lung-cancer cells," N. Engl. J. Med., Jul. 2008, 359(4):366-77.
Miyamoto and Sasakawa, "Studies on granulocyte preservation. III. Effect of agitation on granulocyte concentrates," Transfusion, 1987, 27(2): 165-66.
Nagrath et al., "Isolation of rare circulating tumour cells in cancer patients by microchip technology," Nature, Dec. 2007, 450(7173): 1235-39.
Neu and Meiselman, "Depletion-mediated red blood cell aggregation in polymer solutions," Biophys. J, Nov. 2002, 83(5):2482-90.
Neu et al., "Aggregation of human RBC in binary dextran-peg polymer mixtures," Biorheology., 2001, 38(1):53-68.
Nicholson et al., "Comparison of T and B cell analyses on fresh and aged blood," J Immunol Methods, Oct. 1984, 73(1):29-40.
Office Action in Chinese Application No. 201580054390.3, dated Dec. 10, 2018, 12 pages (with English translation).
Office Action in Chinese Application No. 201580054390.3, dated Apr. 23, 2019, 25 pages (with English translation).
Orringer et al., "Purified poloxamer 188 for treatment of acute vaso-occlusive crisis of sickle cell disease: a randomized controlled trial," JAMA., Nov. 2001, 286(17):2099-2106.
Ozkumur et al., "Inertial focusing for tumor antigen-dependent and -independent sorting of rare circulating tumor cells," Sci. Transl. Med., 2013, 5(179): 179ra47.
Ramanujam et al., "Stabilization of Nucleic Acids in Whole Blood: An Alternative to Guthrie Cards", Biotechniques, Nov. 1993, 15: 825-8.
Reimers et al., "Potentiation by red blood cells of shear-induced platelet aggregation: relative importance of chemical and physical mechanisms," Blood, Dec. 1984, 64(6):1200-1206.
Schmid-Schonbein et al., "On the shear rate dependence of red cell aggregation in vitro," J Clin. Invest., 1968, 47(6): 1447-54.
Stephens et al., "The dielectrophoresis enrichment of CD34+ cells from peripheral blood stem cell harvests," Bone Marrow Transplant, Oct. 1996, 18:777-82.
Thomas et al., "Extracellular DNA traps are associated with the pathogenesis of TRALI in humans and mice," Blood, Jun. 2012, 119(26):6335-43.
Toner and Irimia, "Blood-on-a-chip," Annu. Rev. Biomed. Eng., 2005, 7:77-103.
Toth et al., "Inhibition of polymer-induced red blood cell aggregation by poloxamer 188," Biorheology, 2000, 37(4):301-12.
Wong et al., "The Role of Physical Stabilization in Whole Blood Preservation", Scientific Reports, Feb. 2016, 6: 21023.
Yu et al., "Circulating tumor cells: approaches to isolation and characterization," J Cell Biol., Feb. 2011, 192(3):373-82.
Yu et al., "Ex vivo culture of circulating breast tumor cells for individualized testing of drug susceptibility," Science, Jul. 2014, 345(6193):216-20.
Zhu et al., "A microdevice for multiplexed detection oft-cell-secreted cytokines," Lab on a Chip, 2008, 8(12):2197-2205.
JP Office Action in Japanese Appln. No. 2017-50678, dated May 28, 2019, 7 pages (with English translation).
CN Office Action in Chinese Appln. No. 201580054390.3, dated Feb. 3, 2020, 19 pages (with English translation).
EP Extended European Search Report in European Appln. No. 20150503.9, dated Jun. 15, 2020, 10 pages.
CN Office Action in Chinese Appln. No. 201580054390.3, dated Jun. 28, 2020, 12 pages (with English translation).
CA Office Action in Canadian Appln. No. 2,957,353, dated Aug. 20, 2021, 5 pages.
CN Office Action in Chinese Appln. No. 201580054390.3, dated Nov. 15, 2021, 17 pages (with English summary).
Kuhne et al., "Flow Cytometric Evaluation of Platelet Activation in Blood Collected Into EDTA vs. Diatube-H, a Sodium Citrate Solution Supplemented With Theophylline, Adenosine, and Dipyridamole," Am J Hematol, Sep. 1995, 50(1),40-45.
Notice of Allowance in Chinese Appln. No. 201580054390.3, dated Mar. 9, 2022, 3 pages (with English translation).
O'Connor et al., "Usefulness of Soluble and Surface-Bound P-Selectin in Detecting Heightened Platelet Activity in Patients With Congestive Heart Failure," Am J Cardiol., May 1999, 83(9),1345-1349.
Office Action in Canadian Appln. No. 2,957,535, dated Mar. 10, 2022, 4 pages.
Office Action in Japanese Appln. No. 2020-066388, dated Nov. 22, 2021, 9 pages (with English translation).
BDJ.co.jp [online], "BD Vacuteina Blood Collecting Tube," 2022, retrieved on Aug. 16, 2022, retrieved from URL<https://www.bdj.co.jp/pas/products/mekkin/lf3pro00000ntpw3.html>, 2 pages (with English translation).
Med.Kyushu-u.ac.jp [online], "Kyushu University Hospital Laboratory Inspection Section Newsletter," Apr. 20, 2007, retrieved on Aug. 16, 2022, retrieved from URL<https://www.med.kyushu-u.ac.jp/cclm/html/tayori/kensa32.htm>, 15 pages (with English translation).
Office Action in Japanese Appln. No. 2020-066388, dated Aug. 2, 2022, 6 pages (with English translation).

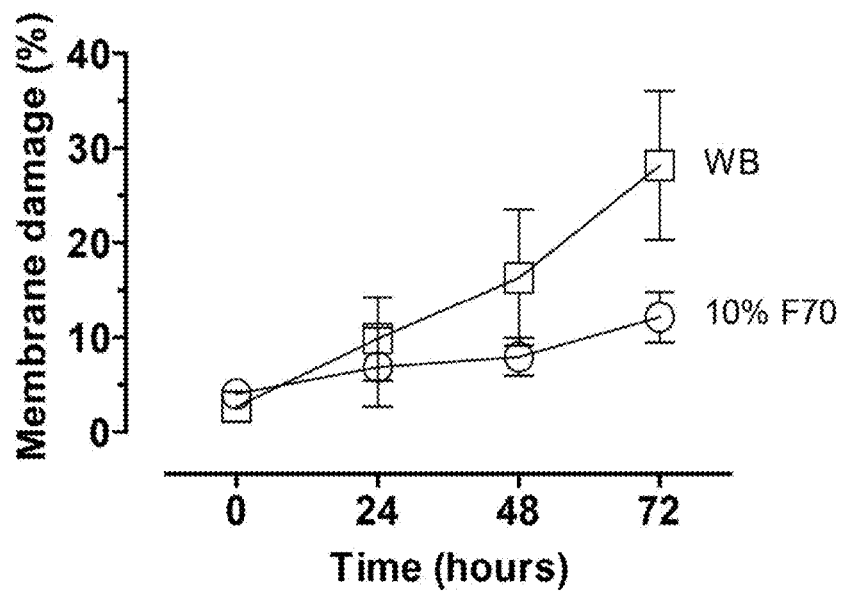
FIG. 5
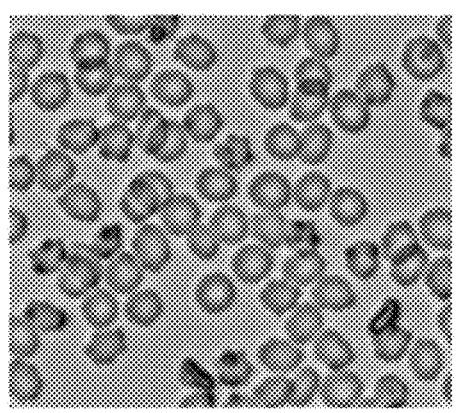 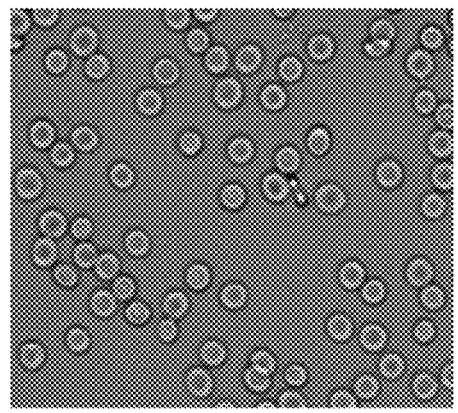
FIG. 6A      Fig. 6B

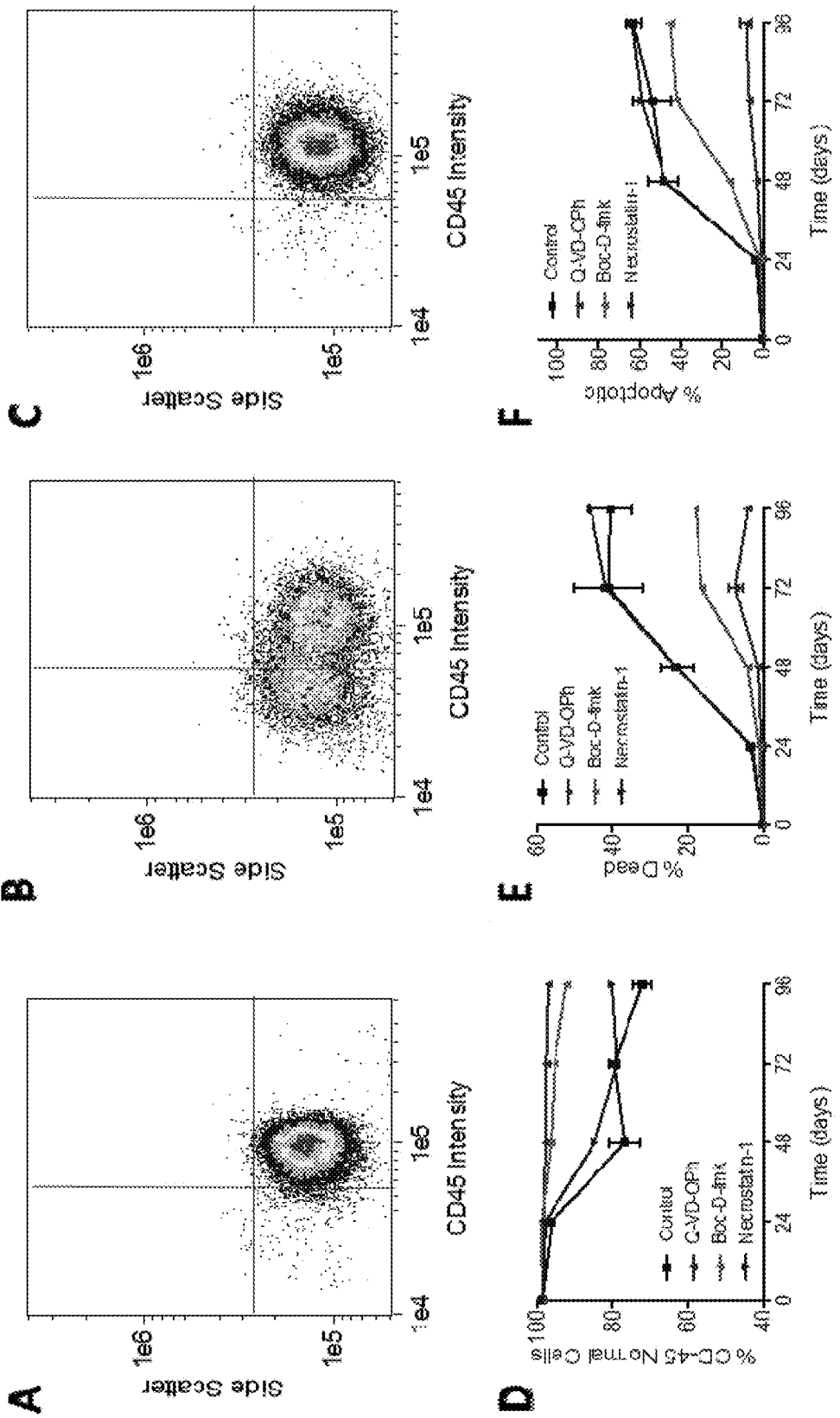
FIGS. 8A-F

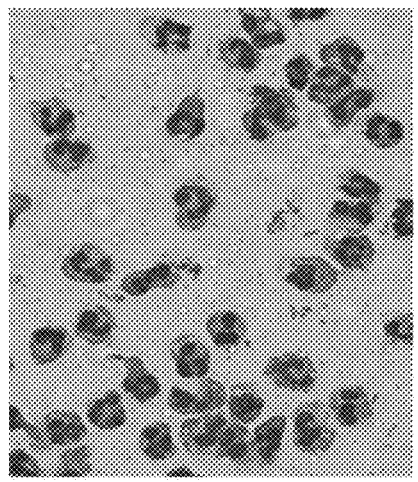
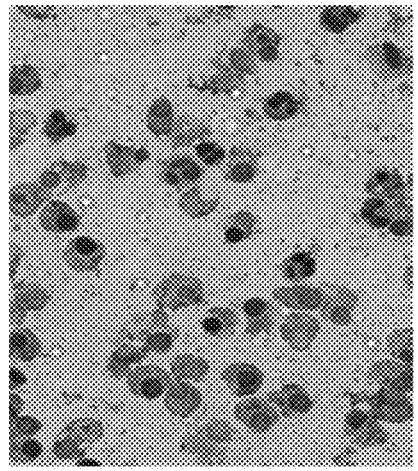
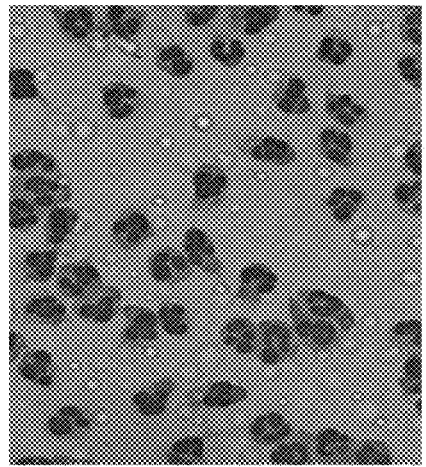
FIGs. 8G-I

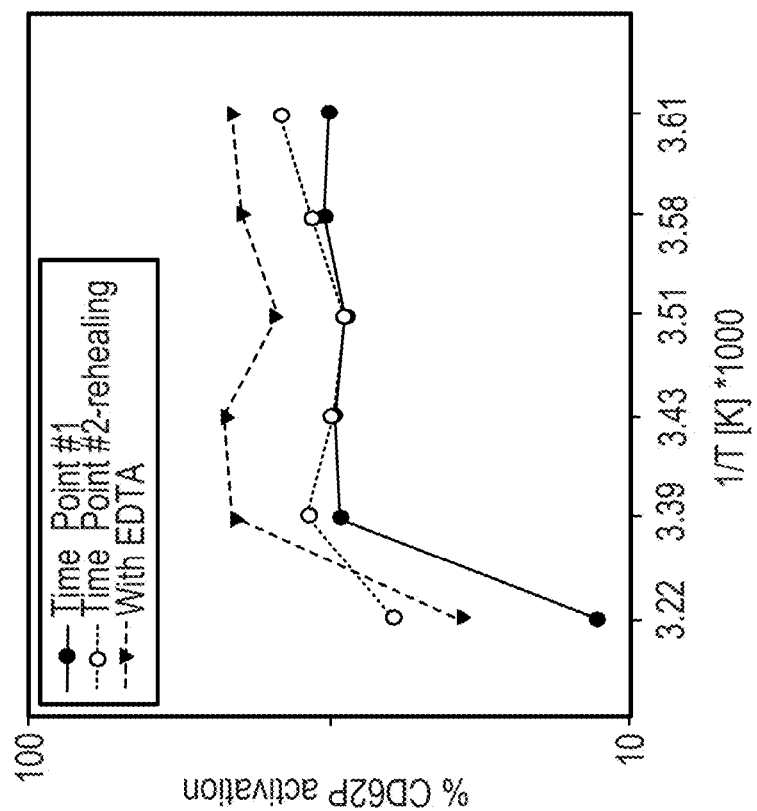
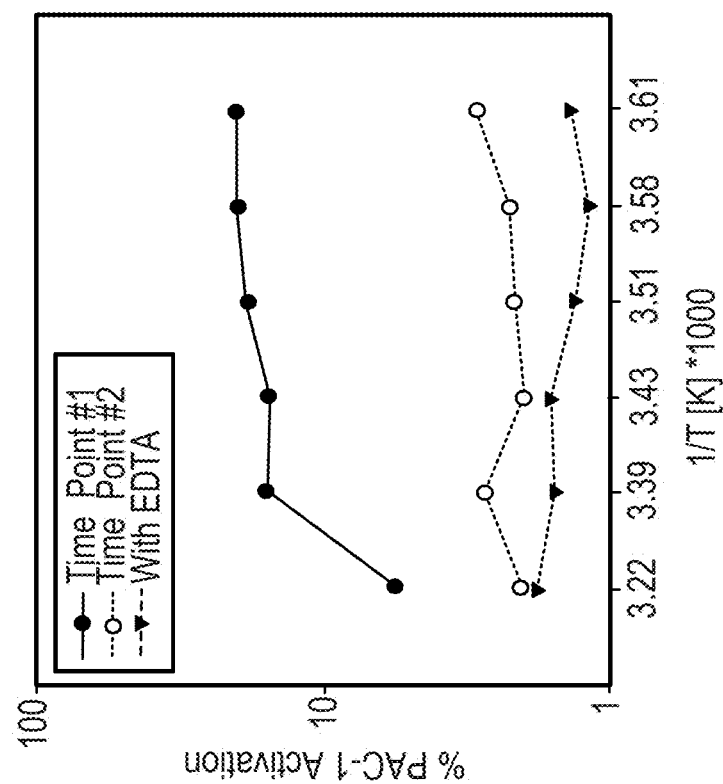
FIG. 10

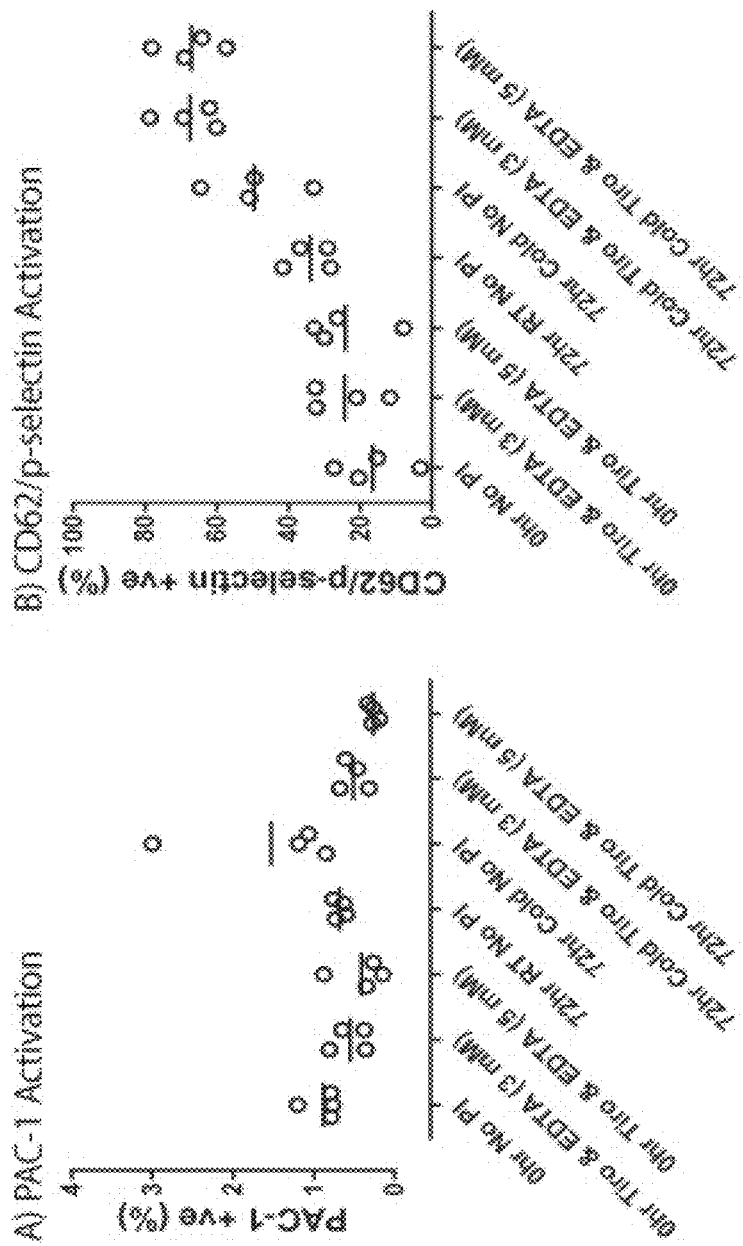
FIGs. 12A-B

FIG. 17A-F

STABILIZATION OF WHOLE BLOOD SAMPLES

CLAIM OF PRIORITY

This application is a continuation of U.S. patent application Ser. No. 15/502,261, filed Feb. 7, 2017, now U.S. Pat. No. 10,750,739, which is a § 371 National Stage Application of PCT/US2015/043269, filed Jul. 31, 2015, which claims the benefit of U.S. Provisional Application Ser. No. 62/037,632, filed on Aug. 15, 2014, and 62/034,481, filed on Aug. 7, 2014. The entire contents of the foregoing applications and patent are incorporated herein by reference.

FEDERALLY SPONSORED RESEARCH OR DEVELOPMENT

This invention was made with Government support under Grant Nos. EB002503 and EB012493 awarded by the National Institutes of Health. The Government has certain rights in the invention.

TECHNICAL FIELD

This invention relates to methods for stabilizing blood samples, e.g., clinical blood samples, for storage.

BACKGROUND

Peripheral blood is the most frequently accessed tissue in the clinic, and the isolation of blood-borne cells is of broad clinical and scientific importance in hematology, transfusion, immunology, regenerative medicine, and oncology. Recent developments in microengineering have greatly advanced our capabilities in isolating pure populations of cells and performing high-throughput, multidimensional assays (1). The rapidly growing field of blood-on-a-chip technologies has expanded into applications ranging from T cell isolation for HIV disease monitoring (2) and multiplexed detection of cytokine secretion (3); gene expression profiling of neutrophils in trauma and burn patients (4); enrichment of CD34+ hematopoietic stem cells (5); to minimally invasive detection of nucleated red blood cells (RBCs) from maternal blood (6) as well as rare circulating tumor cells for cancer diagnosis (7) and identification of druggable mutations (8).

Similar to any tissue, however, whole blood (WB) deteriorates quickly ex vivo. Degradation events such as nutrient deprivation, oxidative stress, changes in osmolarity and pH, and accumulation of toxic metabolic byproducts quickly commence. Within hours, neutrophils undergo activation, oxidative bursting, as well as necrosis and apoptosis. Blood settling causes physical stress, and exacerbate degradation by mechanically compacting necrotic cells in a confined space that accelerates collateral damage and cross-activation. Transportation of blood samples results in uncontrolled shaking which induces hemolysis and platelet activation. These damages not only affect the viability and functionality of the cells of interest in the sample, but also immensely impact the enrichment technologies in a wide spectrum of applications. For instance, shedding of surface antigens render antibody-based sorting ineffective. Red blood cell rouleaux formation may trap rare cells. In particular, microfluidic sorting technologies which are essential for efficient cell sorting are compromised by echinocytes (aged red blood cells that form spiculations), platelet activation and clotting, as well as cellular aggregation.

To further complicate preservation strategies for whole blood, hypothermic temperature ranges which can otherwise effectively suppress biochemical reactions and degradation processes have been considered incompatible, due mainly to cold-induced platelet activation. As such, in modern transfusion medicine whole blood is typically stored in room temperature and processed into various components for specialized storage within 24 hours (9). Given that many clinically relevant assays such as sequencing and expression profiling are best performed in large medical centers or diagnostic laboratories, the logistical needs of blood storage and transportation impose severe limitations to the dissemination of next-generation blood-based medical technologies.

Among the many applications that will benefit tremendously from improved preservation of whole blood is the isolation of circulating tumor cells (CTCs), which are shed from solid tumors and capable of hematologic spread of metastasis. Advanced microfluidic technologies have enabled isolation of these extremely rare cells (one in a billion blood cells) from peripheral blood samples of cancer patients, and significant progress has been made in using these cells and their molecular signature for diagnosis, prognosis, identification of druggable mutations, as well as generation of patient-specific models for drug screening. However, these downstream assays are critically dependent upon the isolation of viable, unfixed CTCs that retain the molecular information and cellular function. Degradation of blood not only restricts molecular analysis of CTCs, but also interferes with the precise microfluidic isolation of these extremely rare cells.

SUMMARY

The rapid degradation of whole blood ex vivo imposes logistical limitations on the utilization of blood-borne cells in a variety of next-generation medical technologies. Described herein are several methods, each of which can be used singly or in combination, to preserve whole blood samples for numerous clinical applications. Exemplary applications include but are not limited to: enrichment of leukocyte subtypes such as T-cells or neutrophils for cytokine and immuno-assays; isolation of progenitor cells from cord blood or peripheral blood for transplantation; isolation of fetal cells from the maternal blood for diagnosis; and sorting of circulating tumor cells for cancer detection and therapy.

Thus, the invention provides methods for stabilizing a sample of whole blood. The methods include obtaining a sample of whole blood from a subject, and introducing to the sample Ficoll® 70 to produce 2-20% (w/v) Ficoll® 70 in the sample.

Also provided are methods for stabilizing a sample of whole blood. The methods include obtaining a sample of whole blood from a subject, and introducing to the sample a caspase inhibitor, and optionally a preservative formulation.

Also provided are methods for stabilizing a sample of whole blood. The methods include obtaining a sample of whole blood from a subject, and introducing to the sample a preservative formulation, wherein the preservative formulation comprises 48 mM HEPES, 0.44 mM adenine, 6.75 mM mannitol, 0.77 mM N-acetyl-L-cysteine, and 8.5 mM NaCl.

Also provided are methods for stabilizing a sample of whole blood. The methods include obtaining a sample of whole blood from a subject; and introducing a platelet inhibitor (PI) to the sample.

Also provided are methods for stabilizing a sample of whole blood, the method comprising obtaining a sample of whole blood from a subject, and introducing to the sample one or more of: Ficoll® 70 to produce 2-20% (w/v) Ficoll® 70 in the sample; a caspase inhibitor; a preservative formulation that comprises 48 mM HEPES, 0.44 mM adenine, 6.75 mM mannitol, 0.77 mM N-acetyl-L-cysteine, and 8.5 mM NaCl; and/or a platelet inhibitor (PI).

In some embodiments, Ficoll® 70 is added to produce at least 10% Ficoll® 70 in the sample.

In some embodiments, the caspase inhibitor is Q-VD-OPh ((3S)-5-(2,6-difluorophenoxy)-3-[[(2S)-3-methyl-2-(quinoline-2-carbonylamino)butanoyl]amino]-4-oxopentanoic acid), Z-VAD-FMK (methyl (3S)-5-fluoro-3-[[(2S)-2-[[(2S)-3-methyl-2-(phenylmethoxycarbonylamino)butanoyl]amino]propanoyl]amino]-4-oxopentanoate), Q-VD (OMe)-OPh ((S)-methyl 5-(2,6-difluorophenoxy)-3-((S)-3-methyl-2-(quinoline-2-carboxamido)butanamido)-4-oxopentanoate), or Boc-D-fmk (methyl 5-fluoro-3-[(2-methylpropan-2-yl)oxycarbonylamino]-4-oxopentanoate).

In some embodiments, sufficient caspase inhibitor is added to the sample to achieve a final concentration of 2-10 uM, e.g., about 5 uM.

In some embodiments, the preservative formulation comprises 24-48 mM HEPES, 0.11-0.44 mM adenine, 2.25-6.75 mM mannitol, 0.39-1.54 mM N-acetyl-L-cysteine, 0-13.5 mM dextrose, and 0-17 mM NaCl. In some embodiments, the preservative formulation comprises 48 mM HEPES, 0.44 mM adenine, 6.75 mM mannitol, 0.77 mM N-acetyl-L-cysteine, and 8.5 mM NaCl.

In some embodiments, the blood is stabilized for storage at 20-25° C.

In some embodiments, the blood is maintained or stored for 72-96 hours, e.g., at 20-25° C.

In some embodiments, the PI is ticagrelor, cilostazol, prasugrel, dipyridamole, prasugrel, Tirofiban, eptifibatide, clopidogrel, or KF38789.

In some embodiments, the PI is added to the sample to achieve a final concentration of from 0.01-100 ug/mL, e.g., from 0.01-1 ug/ml, e.g., from 0.01-0.5 ug/mL.

In some embodiments, the blood is stabilized for storage at 2-25° C. In some embodiments, the blood is stabilized for storage at 4° C. In some embodiments, the methods include maintaining the sample at 4° C. In some embodiments, the sample is maintained or stored at 2-25° C. for at least 24, 36, 48, 72, or 96 hours. For example, the samples can be held for 72 hours (for neutrophil stabilization) and at least 96 hours (for erythrocyte stabilization).

As used herein, the phrase "introducing to the sample" can mean adding something to the sample, or adding the sample to something (e.g., putting the sample into a tube that already includes the additive).

The present methods are particularly useful for samples for clinical and laboratory diagnostics, such as microfluidic evaluation of whole blood, and neutrophil migration assays that can indicate the functioning of the immune system (e.g., in diagnosis of sepsis).

The choice of which method(s) described herein to use in a particular situation can be made depending on a number of factors. For example if it is desirable to ship a patient sample to another location, e.g., to a clinical lab, and refrigeration is not an option, the optimized preservative with optional caspase inhibitor can be selected. For a sample that will be evaluated using microfluidic device after shipping, the optimized preservative with optional caspase inhibitor can be selected, with platelet inhibitors also included.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

(FIG. 1A) Representative images that show the measurement of erythrocyte settling rate (ESR) on whole blood (left) and blood that contains 10% F70 (right). (FIG. 1B) ESR of blood samples in whole blood (WB) and blood with different F70 concentrations over 72 hours (WB, n=11; 0% F70, n=9; 5% F70, n=8; 10% F70, n=11; 15% F70, n=9). 0% F70 represents the control condition which was treated with RPMI medium without F70. Error bars represent the 95% confidence interval (CI) of the mean.

(FIG. 2A) Viscosity of blood samples as a function of shear rate (WB, n=5; 5% F70, n=4; 10% F70, n=5; 15% F70, n=5). (FIG. 2B) Densities of blood samples in the presence of different F70 concentrations. (FIG. 2C) When samples were left undisturbed for 20 minutes, RBCs in whole blood (WB) formed aggregates spontaneously. RBC aggregation was greatly inhibited in the presence of 5% F70, and completely prevented in the presence of 10% and 15% F70. Scale bar represents 10 gm. (FIG. 2D) Estimated ESR values calculated from the settling velocity. Here, the RBC was assumed to be a sphere with a radius (R) of 4 μm and density of 1.1 g/cm$^3$; fluid density and viscosity used the measured values in the respective F70 conditions. Settling as single cells is extremely slow regardless of the medium (WB, 10% F70, and 15% F70). However, cellular aggregation effectively increases the radius of the particle (i.e., R×2, R×3, etc.) and thereby greatly increases the rate of settling. (FIG. 2E) The computed thickness of the depletion layer on the surface of RBCs in the presence of Ficoll® 70 kDa or 400 kDa polymers at a range of bulk concentrations. (FIG. 2F) The minimum interaction energy of Ficoll® 400 kDa in a range of bulk concentrations. Negative energies are indicative of attractive forces which cause RBC aggregation. Interaction energies due to Ficoll® 70 kDa are universally non-negative and are therefore not shown. (FIG. 2G) RBCs aggregated immediately in the presence of 5% Ficoll® 400 kDa. Scale bar represents 10 μm.

(FIG. 3A) Representative phase-contrast images of RBCs in WB or 10% F70 stored for up to 72 hours. Echinocytes are RBCs that contain spiculations. Scale bar represents 10 μm. (FIG. 3B) Percentages of echinocytes in blood samples stored in different F70 concentrations over 72 hours (WB, n=9; 0% F70, n=8; 5% F70, n=6; 10% F70, n=7; 15% F70, n=6). Error bars represent the 95% confidence interval (CI) of the mean.

(FIG. 4A) High-power (100×) microscopic images of stained neutrophils in fresh blood (0 hr) and blood stored for 72 hours either as whole blood or in 10% F70. The nuclei of fresh neutrophils display the distinct segmented, multilobular morphology (0 hr), which is better preserved in 10% F70 than WB. Scale bar represents 10 μm. (FIG. 4B) Percentage of leukocytes or neutrophils that stain positive for Sytox Blue (i.e., membrane-compromised) after storage in WB or 10% F70 for 72 hours. (FIG. 4C) Percentage of leukocytes or neutrophils that stained positive for caspase-3/7 activity after storage in WB or 10% F70 for 72 hours. (FIG. 4D) Highly dispersed nuclear materials accompanying cytoplasmic remnants were found in stored blood. Scale bar represents 10 μm. (FIG. 4E) Immunofluorescence images of a healthy neutrophil (top row) and a neutrophil extracellular trap (NET; bottom row) stained with antibodies to neutrophil elastase and the histone-DNA complex, and DAPI. Note the large area of NET compared to single RBCs in the brightfield image. Scale bars represent 10 μm. (FIG. 4F) Quantification of neutrophil elastase in blood samples stored for 72 hours. In fresh blood samples, neutrophil elastase was detected at a level of 37.8±16.5 mU/mL of blood (n=7). As a positive control, fresh whole blood stimulated with phorbol myristate acetate (a potent inducer of NETs; n=7) increased the level to 81.4±64.4 mU/mL.

FIG. 5. Percentage of leukocytes that stain positive for Sytox Blue after storage in WB or 10% F70 for 24, 48, and 72 hours (WB, n=10; 10% F70, n=10). Leukocytes in WB were significantly less viable than 10% F70 at 48 hr ($p<0.05$) and 72 hr ($p<0.001$), 2-way ANOVA with Bonferroni posttest.

FIGS. 6A-6C. (FIG. 6A) Image of erythrocytes stored under ambient condition in whole blood reveals formation of echinocytes (spherical, speculated cells). (FIG. 6B) Following a storage period of 24-96 h, the sample can be incubated for 4 h at 37C in the presence of 2 mM adenosine to reduce the number of echinocytes, essentially revitalizing the erythrocytes. (FIG. 6C) Degradation of erythrocytes in patient whole blood is observed over time (n=5). The effectiveness of the CS-Original formulation is nearly identical to the control with limited capability of supporting revitalized erythrocytes. The formulation produced from condition 18 on the modified Taguchi table reveals superior ability to support erythrocyte revitalization after 72 h storage, where 96±1% of the erythrocytes appear healthy.

FIGS. 8A-8I. Neutrophils were isolated from fresh healthy donor blood and added to culture media (IMDM, 20% FBS). Control (culture media only) and treated (apoptosis/necrosis inhibitor+culture media). Samples were examined at 0, 24, 48, 72 and 96 h following ambient storage. Side scatter vs CD45 expression for (FIG. 8A) fresh neutrophils (FIG. 8B) 96 h control neutrophils and (FIG. 8C) 96 h Q-VD-OPh-treated neutrophils. (FIG. 8D) Control and treated samples were monitored over time to measure changes in CD45 expression, (FIG. 8E) identify the number of dead and (FIG. 8F) apoptotic neutrophils under each condition. Bright field images were taken from Wright-Giemsa stained smears from (FIG. 8G) fresh neutrophils, (FIG. 8H) control neutrophils after 96 h of storage and (FIG. 8I) Q-VD-OPh treated neutrophils after 96 h of storage.

(FIG. 9A) The migratory response to fMLP was preserved in samples treated with Q-VD-OPh (following 72 h storage), nearly indistinguishable from the migratory response of the freshly isolated neutrophils. However, under control conditions, there was significant loss in migratory activity. (FIG. 9B) This preservation of neutrophil function was also observed by their migratory speed, where Q-VD-OPh treated samples maintained comparable speed to freshly isolated neutrophils.

FIG. 10. Platelet activation as a function of temperature. Platelets were incubated at temperatures ranging from 4-37° C. for 20 minutes (time point #1) and either heated to 37° C. for 1 hour (time point #2) or combined with 5 mM EDTA (with EDTA) prior to staining for platelet activation surface markers and imaging flow cytometry. PAC-1 is the active form of GPIIb/IIIa and the expression of CD62P is a marker of platelet degranulation. Platelet activation was determined by assessing the percent of platelets which express cell surface activation markers. Our data shows that cold-induced activation of platelets is associated with two surface proteins, CD62/p-selectin and GPIIa/IIIa, and the largest changes in platelet activation occur between 37 and 22° C.

FIGS. 12A-12D. Non-toxic platelet inhibitor cocktail. Whole blood is incubated on a rocker with Tirofiban (0.1-0.5 ug/mL) for ten minutes prior to storage. During storage at either room temperature or 4° C., the blood is not rocked. After storage, EDTA (2-5 mM) is added to the blood during rocking for up to 75 min. No PI indicates no platelet inhibitor was added to the sample. (FIG. 12A) The expression of the platelet activation surface marker PAC-1 comparing 0 hr and 72 hr cold or room temperature storage with or without the platelet inhibitor cocktail. (FIG. 12B) The expression of the platelet activation surface marker CD62P comparing 0 hr and 72 hr cold or room temperature storage with or without platelet inhibitor cocktail. (FIG. 12C) The associated gating for determining percent platelet activation and representative flow cytometry images for the platelet activation panel. (FIG. 12D) Platelet aggregometry traces which show the complete inhibition of platelet function with the application of our platelet inhibitor cocktail. Thrombin was used as the agonist (1 UNIT/500 μl whole blood) to induce platelet activation. Platelets interacting with leukocytes were determined using imaging flow cytometry whereby platelet-leukocyte interactions were defined by CD41 and CD45 dual positive signals. The platelet inhibitor cocktail is able to complete reverse platelet-leukocytes interactions.

(FIG. 17A) Image depicting severe clogging in the absence of platelet inhibitors. The image shows fluorescence staining of DNA by Vybrant DyeCycle Green (Life Technologies) in the first stage of the filtration array of the CTC-iChip. Scale bar represents 100 μm. (FIG. 17B) Plot illustrating total blood volume processed through the CTC-iChip as a percentage of the target volume (5-6 mL). The data compares fresh and stored blood with and without platelet inhibitor cocktail. (FIG. 17C) Blood throughput or flow rate (mL/hr) of whole blood processed through the CTC-iChip comparing fresh and stored blood with and without platelet inhibitor cocktail. (FIG. 17D) The recovery of spiked circulating tumor cells (CTCs) post iChip sorting, calculated based on the actual processed volume. This recovery percentage is only based on the processed blood volume, which was greatly decreased in the event of chip clogging shown in (FIG. 17B). The absolute recovery of CTCs was therefore much lower and could be calculated by the recovery percentage×volume processed. (FIG. 17E) The log-transformed fold depletion of leukocytes by the CTC-iChip. The higher the depletion, the more pure the enriched CTC population. A depletion of 4 log translates to 10000-fold depletion, which means that a typical blood sample containing 5×106 leukocytes/mL of blood would leave only 500 leukocytes/mL of blood processed in the enriched CTC product. (FIG. 17F) Carryover of red blood cells (RBC)/μL of blood into the CTC product.

DETAILED DESCRIPTION

Figure 1:
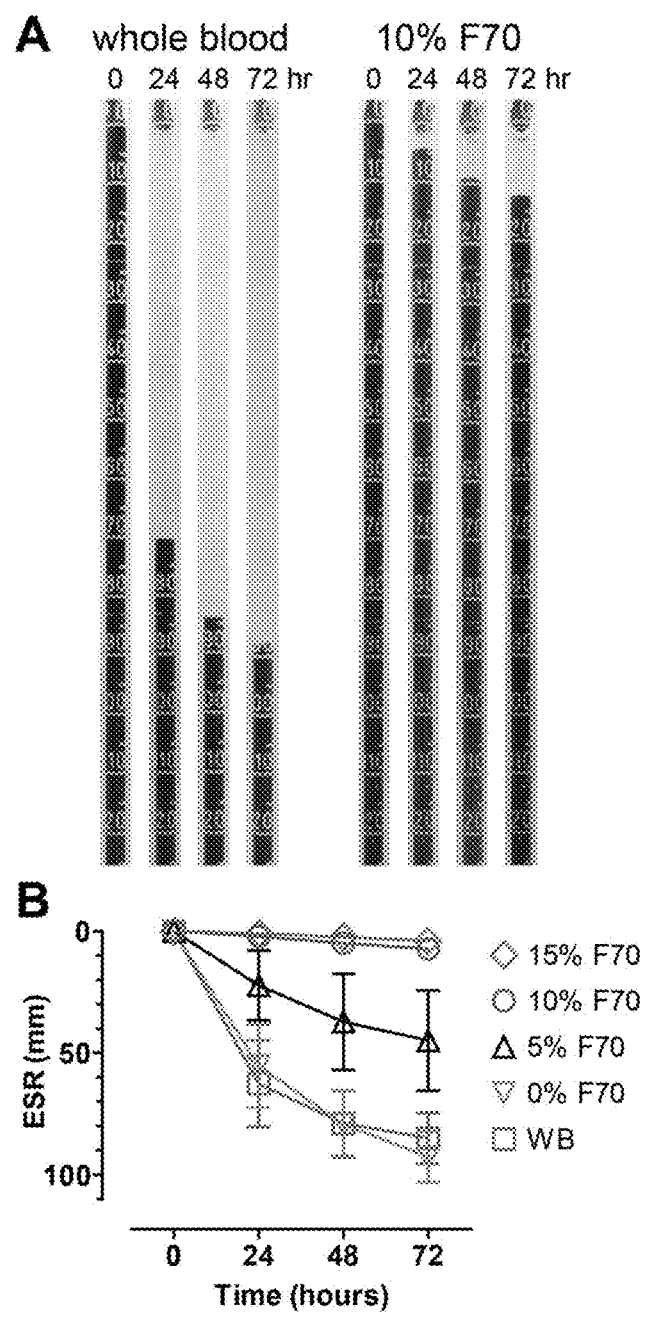
FIGS. 1A-1B.

Improving the preservation of whole blood opens up opportunities for a wide range of clinical and scientific applications. Preservation in the viable state is important not only for applications such as transfusion and tissue regeneration, but also for diagnostic tests that require high-quality molecular materials which can be severely compromised during fixation (19). Described herein are several methods, each of which can be used singly or in combination, to preserve whole blood samples for numerous clinical applications. Exemplary applications include but are not limited to: enrichment of leukocyte subtypes such as T-cells or neutrophils for cytokine and immuno-assays; isolation of progenitor cells from cord blood or peripheral blood for transplantation; isolation of fetal cells from the maternal blood for diagnosis; and sorting of circulating tumor cells for cancer detection and therapy.

Method 1. Stabilizing Blood Samples in the Fluid Phase

Despite developments in preservation solutions that are designed for purified blood components, progress in the preservation of whole blood has been relatively limited, and no attempts have been made to address the fundamental issue of blood settling. As shown herein, blood settling and the associated cellular degradation can be minimized by physical stabilization.

Blood sedimentation can be understood in terms of simple physics. For a single sphere settling in a viscous fluid, the weight of the sphere is balanced by buoyancy force and the Stokes' drag force, giving the settling velocity $$v_s = \frac{2}{9} \frac{\rho_p - \rho_f}{\mu} gR^2,$$

where $\rho_p$ is the density of sphere, $\rho_f$ is the density of fluid, $\mu$ is the fluid viscosity, g is gravity, and R is the radius of the sphere. Therefore, settling speed is proportional to the density difference (between the sphere and the fluid) and the square of the radius, and is inversely proportional to fluid viscosity. This equation explains why red blood cell aggregation (increased R) increases the erythrocyte settling rate (ESR).

To achieve suspended storage of blood, we chose the polysaccharide formed by copolymerization of sucrose with epichlorohydrin sold under the trademark Ficoll®, which is highly biocompatible due to its neutral charge and high hydrophilicity. Polymers with similar physiochemical properties, such as dextran and polyethylene glycol, e.g., dextran 40 kDa polymers, can also be used. We first tested the ability of Ficoll® polymers in preventing blood settling over the course of 3 days at room temperature and explored the associated mechanisms. We then studied whether this treatment affects routine blood cell enrichment methodologies, and the effect of physical stabilization on the morphology, viability, and various biological processes of blood cells in storage.

Introduction of Ficoll® polymers into blood is simple and is compatible with common assays for leukocyte enrichment. Physical stabilization inhibited red blood cell aggregation, echinocyte formation, maintained leukocyte viability, and prevented NETosis of neutrophils.

Benefits of Biophysical Stabilization

Figure 2:
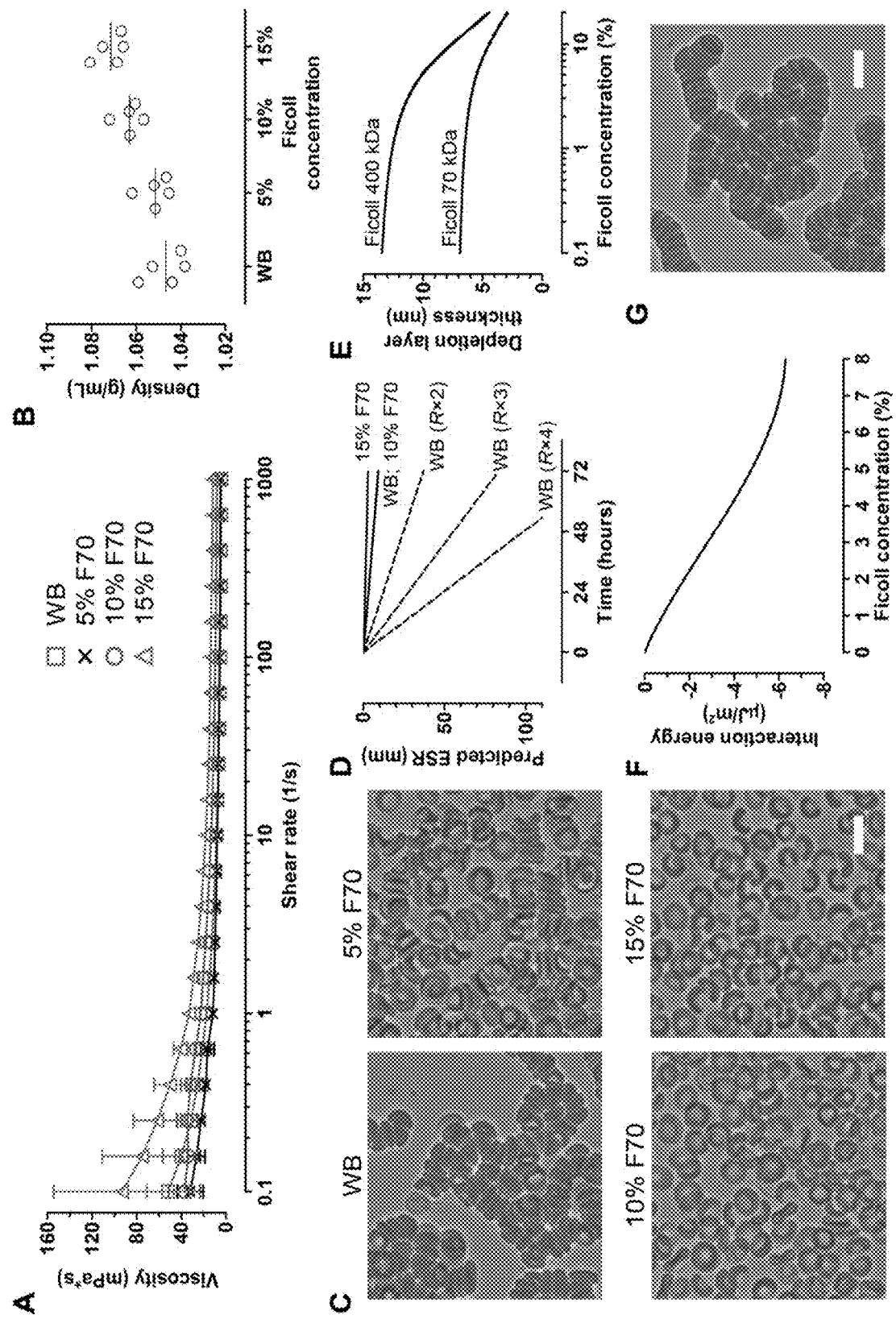
FIGS. 2A-2G.

Inhibition of RBC aggregation confers several benefits to blood samples in terms of both processing and cellular preservation. First and foremost, blood settling is almost completely prevented which eliminates the need for continuous mixing, and may therefore facilitate storage and transportation as well as laboratory assays that require repeated, continuous sampling of blood. In addition, this approach improves the rheological properties of blood by lowering its low-shear viscosity (FIG. 2A). In whole blood, additional stress is required initially to disperse RBC aggregates, giving rise to the characteristic shear-thinning behavior (20, 27). Addition of F70 allows blood samples to flow more easily at low shear ranges (FIG. 2A), which is especially relevant in microfluidic applications. Indeed, small polymers have been exploited to improve blood perfusion in the clinical setting (28, 29).

Despite its simplicity, physical stabilization dramatically improved the preservation of various types of blood cells. Red blood cells, which constitute 99% of the total volume of all blood cells, retained their biconcave morphology in the presence of F70. This result should benefit applications such as size-based cell sorting (e.g., filtration) or microfluidic processes that rely on hydrodynamic properties of cells such as deterministic lateral displacement (30). Leukocytes in particular the fragile neutrophils displayed superior integrity and decreased apoptosis. Further, the inhibition of NET formation has important implications in blood storage. It is known that activated neutrophils release chromatin fibers mixed with neutrophil enzymes to form NETs (31). NETs protects against infection but may also promote thrombosis (32) and autoimmune reactions (33). Further, the release of NETs in stored RBC units for transfusion (17) has been suggested to cause transfusion-related acute lung injury (34). We hypothesize that the presence of NETs components—such as DNA, neutrophil elastase, and myeloperoxidase—induces collateral damage to other cells in whole blood and accelerate the degradation of the entire blood sample. Therefore, the preservation of all blood cells is critical even in applications where the cells of interest are non-hematologic. For instance, the sorting and analysis of rare circulating tumor cells (1 in $10^9$ blood cells) holds great potential as a non-invasive liquid biopsy for the clinical management of cancer (35). Degradation of hematologic cells not only cause collateral damage to the rare circulating tumor cells, but also negatively impact cell sorting technologies that rely on defined biological and physical properties of blood cells.

The easy implementation of our protocol and availability of Ficoll® polymers may provide an opportunity to improve existing procedures and assays. For instance, immunological assays are sometimes performed with a 24-hour delay to account for specimen shipping. Short-term storage of cord blood for up to 48 hours prior to cryopreservation is also a common practice. Within these time frames, the degrading granulocytes (in which >90% are neutrophils) have been found to negatively impact T-cell assays (36, 37). The ability of Ficoll® to maintain neutrophil integrity especially within the shorter time frames (FIG. 5) may find immediate use in similar applications.

In summary, by stabilizing blood in a homogeneous suspension using at least 5%, 10%, or 15% Ficoll® 70, thus minimizing cellular degradation, and limiting the release of cytotoxic breakdown products, we have prevented the vicious cycle of blood settling and re-mixing and thereby addressing a fundamental mechanical issue in sample storage and transportation.

Method 2. Optimized Preservative Formulation

In the second method, an optimized preservative formulation was developed that optionally includes a caspase inhibitor. This formulation is particularly suited for clinical samples, and for all samples that are to be maintained at ambient (e.g., 20-25° C.) temperatures.

A number of caspase inhibitors are known in the art; pan-caspase inhibitors include Q-VD-OPh ((3S)-5-(2,6-difluorophenoxy)-3-[[(2S)-3-methyl-2-(quinoline-2-carbonylamino)butanoyl]amino]-4-oxopentanoic acid), Z-VAD-FMK (methyl (3 S)-5-fluoro-3-[[(2S)-2-[[(2S)-3-methyl-2-(phenylmethoxycarbonylamino)butanoyl]amino]propanoyl]amino]-4-oxopentanoate), Q-VD(OMe)-OPh ((S)-methyl difluorophenoxy)-3-((S)-3-methyl-2-(quinoline-2-carboxamido)butanamido)-4-oxopentanoate), or Boc-D-fmk (methyl 5-fluoro-3-[(2-methylpropan yl)oxycarbonylamino]-4-oxopentanoate). In some embodiments, the caspase inhibitor is Q-VD-OPh, a broad spectrum caspase inhibitor with potent antiapoptotic properties.

The preservative formulation can be, e.g., CS-18 shown below, and can include Q-VD-OPh, e.g., at 2-10 uM, e.g., about 5 uM, 24-48 mM HEPES, 0.11-0.44 mM adenine, 2.25-6.75 mM mannitol, 0.39-1.54 mM N-acetyl-L-cysteine, 0-13.5 mM dextrose, and 0-17 mM NaCl. A preferred formulation is 48 mM HEPES, 0.44 mM adenine, 6.75 mM mannitol, 0.77 mM N-acetyl-L-cysteine, and 8.5 mM NaCl.

Method 3. Cold Storage with Platelet Inhibition

In the third method, a platelet inhibitor is added to the sample before the samples are cooled and kept cold, e.g., at 2-25° C. The platelet inhibitor prevents platelets from activating and aggregating, which interferes with isolation technologies including, but not limited to, antibody-based cell enrichment and microfluidic blood cells sorting, A number of platelet inhibitors are known in the art, including cyclooxygenase inhibitors (e.g., acetylsalicylic acid and triflusal (Disgren)); adenosine diphosphate (ADP) receptor inhibitors (e.g., clopidogrel (Plavix), Prasugrel (Effient), ticagrelor (Brilinta), or ticlopidine (Ticlid)); Phosphodiesterase inhibitors (e.g., cilostazol (Pletal)); Protease-activated receptor-1 (PAR-1) antagonists (e.g., vorapaxar (Zontivity)); Glycoprotein IIB/IIIA inhibitors (e.g., abciximab (ReoPro), eptifibatide (Integrilin), roxifiban, orbofiban, or tirofiban (Aggrastat)); Adenosine reuptake inhibitors (e.g., dipyridamole (Persantine)); Thromboxane inhibitors (e.g., Thromboxane synthase inhibitors or Thromboxane receptor antagonists such as Terutroban); or inhibitors of P-selectin-mediated cell adhesion (e.g., KF38789 (3-[7-(2,4-Dimethoxyphenyl)-2,3,6,7-tetrahydro-1,4-thiazepin-5-yl]-4-hydroxy-6-methyl-2H-pyran-2-one)). In preferred embodiments, the platelet inhibitor is a Glycoprotein IIB/IIIA inhibitor, e.g., Tirofiban, roxifiban, orbofiban, eptifibatide, or abciximab. In some embodiments, a sufficient amount of the platelet inhibitor is added to the sample to produce a dosage ranging from 0.01-100 ug/ml, e.g., from 0.01-1 ug/ml, e.g., from 0.01-0.5 ug/mL.

EXAMPLES

The invention is further described in the following examples, which do not limit the scope of the invention described in the claims.

Example 1. The Role of Physical Stabilization in Whole Blood Preservation

In an attempt to improve the preservation of whole blood samples, we addressed a fundamental but overlooked aspect in the storage of this fluid tissue, namely, blood settling. Blood settling not only induces mechanical stresses, but also compacts blood cells and accelerates collateral damage caused by activated and degrading leukocytes. We found that the polymer Ficoll® 70 kDa stabilized blood samples and prevented blood settling over the course of 72 hours, primarily by inhibiting red blood cell aggregation. This approach was compatible with common leukocyte enrichment techniques including red blood cell lysis and immunomagnetic purification. Physical stabilization was associated with superior preservation of cells when compared to settled blood in measures including echinocyte formation and leukocyte viability and apoptosis. Remarkably, the integrity of neutrophils was preserved and the release of neutrophil elastase—a marker of neutrophil extracellular traps—was significantly decreased. This study showed for the first time that blood settling could be prevented using biomaterials and has implications in a range of diagnostic technologies.

Materials and Methods

The following Materials and Methods were used in Example 1.

Blood samples and addition of Ficoll®

Blood samples were obtained from healthy volunteers or purchased from Research Blood Components (Brighton, Mass.). All blood samples were drawn into Acid Citrate Dextrose-A (ACD-A) tubes (BD Vacutainer; 8.5 mL) and used within four hours.

Whole blood (WB) was used without any modification. To introduce Ficoll® 70 kDa (GE Healthcare) polymers into blood, concentrated stock solutions of Ficoll® (20%, 40%, and 60% w/v) were dissolved into RPMI 1640 Medium (without phenol red; Life Technologies) supplemented with 10 mM HEPES (Life Technologies), filter-sterilized, and added to whole blood at a volumetric ratio of 1:3. For example, to prepare blood with 5% F70, 1 part 20% Ficoll® was added to 3 parts WB and mixed (HulaMixer; Life Technologies) for 10~15 minutes before use. For 0% F70 samples, 1 part RPMI was added to 3 parts WB resulting in a 75% blood volume fraction. Blood samples were stored in sterile, air-tight tubes undisturbed at room temperature.

Erythrocyte Settling Rate Assay

The erythrocyte settling rate (ESR) assay was performed with 1.3 mL of whole blood or Ficoll®-blood using pipets that conform to the dimensions of the standardized Westergren method (Dispette 2; Fisherbrand). The ESR in millimeters was recorded at 24, 48, and 72 hours.

Rheology

Couette rheometry was performed using a TA Instruments Discovery HR-3 rheometer with a steel double-wall concentric cylinder geometry. 8.5 mL of sample was used for each experiment. Data points were acquired at shear rates ranging from 0.1/s to 1000/s, at 5 points per decade.

Morphological Assessment of Blood Cells

For the enumeration of echinocytes, samples were gently mixed before a drop (~10 µL) was transferred to a glass slide, smeared, and imaged using phase-contrast microscopy at 40× using an EVOS FL Cell Imaging System (Life Technologies). About 100 random RBCs were counted per sample and echinocytes were identified by their distinct spiculations.

Wright-Giemsa staining was performed according to standard procedures. Briefly, a drop (~10 µL) of sample was smeared on a glass slide, air-dried, fixed in 100% methanol, and dipped in Wright-Giemsa stain (Sigma) for 30 seconds before rinsing in deionized water. Images were captured with a Nikon DS-Ri1 color camera (12-bit; 1280×1024 resolution) using a Nikon 100× Apo VC 100×/1.40 oil objective on a Nikon Eclipse 90i microscope.

Leukocyte Enrichment and Yield Quantification

Red blood cell lysis was performed using Red Blood Cell Lysis Solution (Miltenyi Biotec). After lysis, cells were spun down at 300×g, washed with 10 mL RoboSep buffer (Miltenyi Biotec), spun again, resuspend in 600 µL RoboSep buffer, and counted using a Beckman Z2 Coulter Counter. Neutrophil enrichment was performed using the EasySep Human Neutrophil Enrichment Kit (Stemcell Technologies) according to manufacturer's protocol. Briefly, the depletion antibody cocktail was mixed with the enriched leukocytes (obtained by RBC lysis) followed by incubation with magnetic particles. The EasySep Magnet was then used to immobilize unwanted cells as the label-free neutrophils were poured into another conical tube. Enriched neutrophils were then re-spun and resuspended in 1 mL RPMI media containing 0.3% BSA and 10 mM HEPES, counted, and stained for imaging flow cytometry.

Imaging Flow Cytometry for Surface Markers and Cell Viability

Imaging flow cytometry was performed using the ImageStream$^X$ Mark II imaging flow cytometer (Amnis Corporation) equipped with a 40× objective, 6 imaging channels, and 405 nm, 488 nm, and 642 lasers. For analysis of cell viability and CD45 expression, the enriched leukocytes were resuspended in 0.1% BSA in HEPES buffered saline after RBC lysis and stained with the following antibodies and stains where applicable: DRAQ5 (1 µM; Cell Signaling Technologies), Sytox Blue (1 µM; Life Technologies), CellEvent Caspase-3/7 Green Detection Reagent (0.75 µM; Life Technologies), FITC-conjugated CD45 antibody (1:500; clone 5B1; Miltenyi Biotec), PE-conjugated CD66b antibody (1:125; clone G10F5; Stemcell Technologies), and PE-Cy7-conjugated CD16 antibody (1:200 or 1:333; clone 3G8; BD Biosciences). Single cells were gated using the nuclear marker DRAQ5. Neutrophils were identified by the dual positivity of CD66b and CD16. For analysis of neutrophil activation post-enrichment, cells were stained with DRAQ5 (1 µM; Cell Signaling Technologies), VioBlue-conjugated CD45 antibody (1:100; clone 5B1; Miltenyi Biotec), Alexa Fluor 488-conjugated CD11b antibody (1:500; clone ICRF44; Stemcell Technologies), PE-conjugated CD66b antibody (1:125; clone G10F5; Stemcell Technologies), and PE-Cy7-conjugated CD16 antibody (1:333; clone 3G8; BD Biosciences).

Immunofluorescence Staining and Microscopy for Visualization of NETs

Blood smears on poly-L-lysine coated glass slides were fixed in 100% methanol, air-dried, fixed with 4% paraformaldehyde, and blocked and permeabilized (2% goat serum+ 0.1% Triton X-100) for 4 hours at room temperature. Slides were then were incubated with anti-neutrophil elastase rabbit pAb (25 µg/mL; Calbiochem) and anti-H2A-H2B-DNA mouse mAb (clone PL2-6; 1 µg/mL) in 0.3% bovine serum albumin overnight at 4° C. Next, the slides were incubated with Alexa Fluor 488-conjugated goat anti-rabbit IgG and Alexa Fluor 555-conjugated goat anti-mouse IgG (both 1:500; Life Technologies) for 45 minutes at room temperature, rinsed with PBS, and mounted using VECTASHIELD Mounting Medium with DAPI (Vector Laboratories). Imaged were captured with a QImaging Retiga 2000R camera using a Nikon S Plan Fluor ELWD 60×/0.70 objective on a Nikon Eclipse 90i microscope.

Quantification of Neutrophil Elastase

Blood samples were mixed gently, warmed to 37° C. for four hours for the release of NETs contents into the plasma, and diluted with PBS to a final blood volume fraction of 25% before centrifugation at 2000×g for 5 minutes. The supernatant was then carefully transferred to a new centrifuge tube and stored at −80° C. for further processing. The level of neutrophil elastase was quantified using the Neutrophil Elastase Activity Assay Kit (Cayman Chemical Company) according to manufacturer's protocol, using a SpectraMax M5 spectrometer (Molecular Devices). As a positive control for NETosis, phorbol myristate acetate (100 nM) was added to fresh whole blood prior to incubation.

Statistical Analyses

Numerical data are reported as mean±standard deviation. Pairwise comparisons used the Mann-Whitney test. For comparisons of densities, we used 1-way ANOVA followed by the posttest for linear trend. For comparisons of WB and F70 conditions over time, we used 2-way ANOVA followed by the Bonferonni posttest for pairwise comparisons. All statistical analysis was performed with Prism 5 (GraphPad).

Example 1.1 Biophysical Stabilization of Blood

We quantified the ESR with standardized pipets used in the Westergren method (FIG. 1A). Whole blood in the absence of Ficoll® settled quickly, reaching 62.6±26.5 mm at 24 hours and further to 78.9±20.0 and 84.9±15.6 mm at 48 and 72 hours respectively (FIG. 1B). To introduce Ficoll® 70 kDa (F70) into blood, we mixed concentrated stock solutions of F70 (dissolved in RPMI media) to blood samples in a ratio of 1:3 to result in the final indicated F70 concentrations (w/v). The addition of 5%, 10%, and 15% F70 greatly decreased the ESR at all measured timepoints (FIG. 1B; $p<0.0001$ compared to WB at 24, 48, and 72 hours). Impressively, 10% and 15% F70 almost completely prevented settling over the course of 72 hours (ESRs were 7.3±3.1 mm and 4±1.6 mm, respectively; FIG. 1B). To confirm that the stabilization effects were due to F70 but not the added media, we found no difference in ESR by diluting whole blood with RPMI at the same ratio (0% F70, FIG. 1B; $p>0.05$ compared to WB at all timepoints).

To understand how Ficoll® polymers stabilized whole blood, we characterized their rheological properties which are relevant in blood settling, namely, viscosity, density, and cell aggregation. We first performed Couette viscometry on blood samples at shear rates ranging from 0.1/s to 1000/s. Whole blood exhibited shear-thinning behavior, with viscosity decreasing from 51.9±18.9 cP at a shear rate of 0.1/s to 4.1±0.4 cP at a shear rate of 1000/s (FIG. 2A). The addition of 15% F70 increased the low-shear viscosity of blood samples ($p<0.01$ at shear rates ≤0.398/s, compared to WB) and retained a shear-thinning profile (FIG. 2A). In contrast, 5% and 10% F70 did not significantly alter the viscosity of whole blood (FIG. 2A). Surprising, both these F70 concentrations exhibited lower viscosities than 15% F70 in the low shear ranges ($p<0.05$ at shear rates ≤0.631/s for 5% vs. 15% F70; $p<0.01$ at shear rates ≤0.251/s for 10% vs. 15% F70). The densities of WB, 5% F70, 10% F70, and 15% F70 were 1.047±0.009 g/mL, 1.051±0.007 g/mL, 1.063±0.006 g/mL, and 1.071±0.006 g/mL respectively (FIG. 2B; $p<0.0001$, 1-way ANOVA with post-test for linear trend).

That the increases in density are minimal (2.3% only for 15% F70) and changes in viscosities insignificant (for 5% and 10% F70) suggested that Ficoll® stabilizes whole blood by preventing RBC aggregation. Estimation of ESR values based on the settling velocity vs demonstrated that settling is minimal (<10 mm) even in whole blood so long as RBCs settle as single cells (FIG. 2D). Because the settling velocity scales with the square of the particle radius, RBC aggregation contributes most significantly to increased ESR (FIG. 2D). We experimentally confirmed that RBCs in whole blood aggregated quickly within minutes, whereas the addition of F70 greatly inhibited aggregation (FIG. 2C). Notably, 10% and 15% F70 completely prevented aggregation (FIG. 2C) and sufficiently explains the agreement between the estimated and measured ESR values in these two experimental conditions.

Without wishing to be bound by theory, we also investigated the mechanisms of stabilization. Blood settling in whole blood is driven by spontaneous RBC aggregation in the presence of large plasma proteins, of which fibrinogen (~340 kDa; hydrodynamic radius ~11 nm) is the most extensively studied (20, 21). The molecular forces involved in RBC aggregation can be described by the depletion interaction mechanism (22), which states that macromolecules of a large hydrodynamic radius (>>4 nm) are preferentially excluded near the RBC surface, thereby inducing an osmotic force (i.e., depletion force) that results in aggregation of RBCs (22, 23). This force can be generated by both protein and non-protein polymers and explains the aggregating effects of large hydroxyethyl starch (>130 kDa) and Ficoll® 400 kDa (radius=10 nm) which are commonly used to accelerate RBC sedimentation for leukocyte enrichment.

Less appreciated, however, is that small polymers instead inhibit RBC aggregation (24, 25) by decreasing the osmotic force in the depletion layer owing to their ability to penetrate this confined space (23, 26). To understand whether this depletion model is also consistent with our experimental findings with Ficoll® polymers, we computed the interaction energies between RBCs in the presence of 70 kDa (radius=5.1 nm) or 400 kDa Ficoll® (radius=10 nm) according to the theoretical formulation by Neu and Meiselman (22). Here, we considered electrostatic repulsion forces due to the negatively charged glycocalyx on RBC surfaces as well as depletion forces induced by polymer exclusion, taking into consideration the spherical shape of Ficoll® molecules in the calculation of osmotic properties. We found that the larger Ficoll® 400 kDa results in depletion layers thick enough (FIG. 2E) to reduce the total interaction energies to negative values (i.e., attractive forces; FIG. 2F). In contrast, interaction energies in the presence of Ficoll® 70 kDa were universally non-negative. We also experimentally confirmed that Ficoll® 400 kDa (5%) led to RBC aggregation (FIG. 2G).

Example 1.2 Red Blood Cell Preservation

Figure 3:
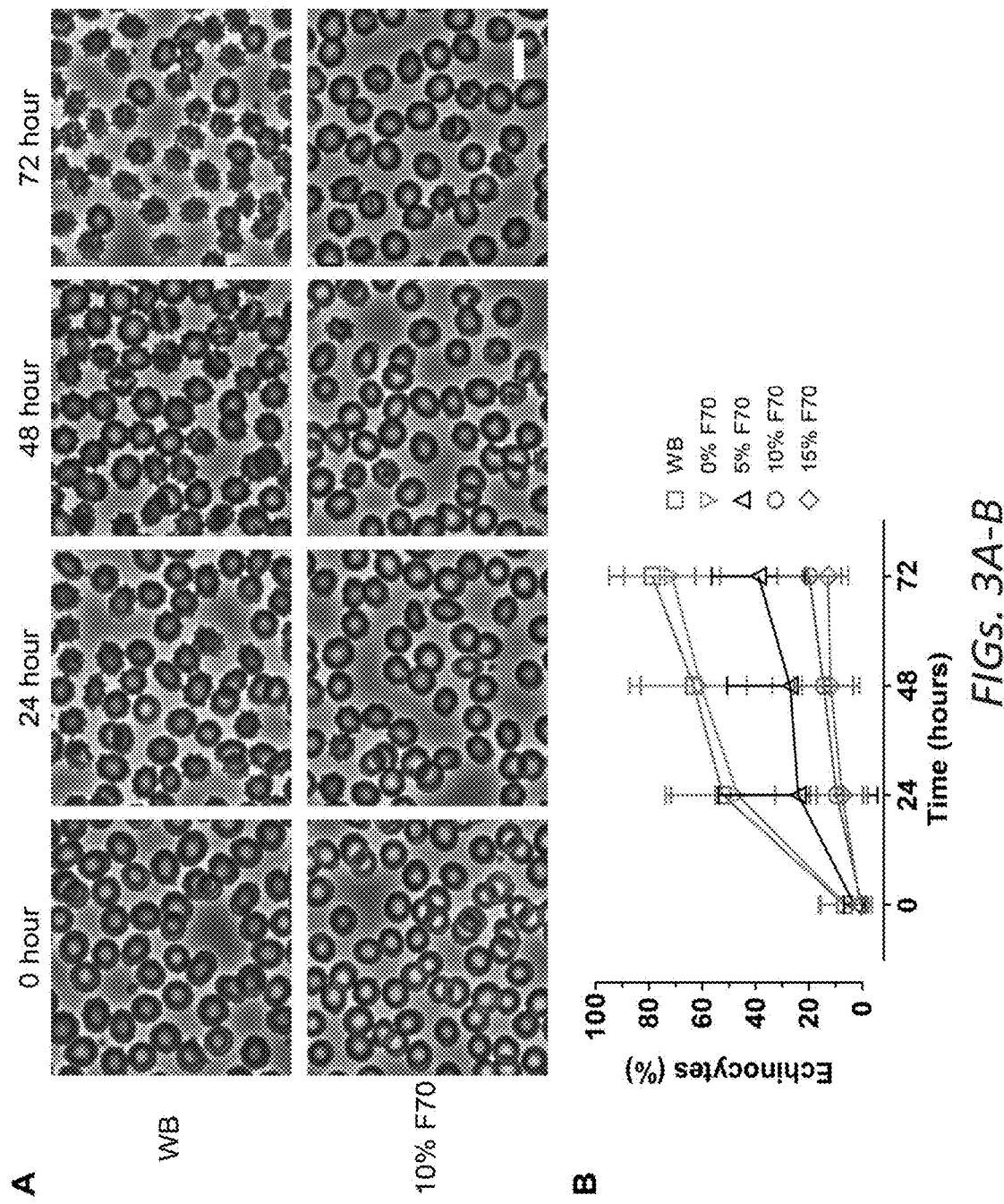
FIGS. 3A-3B.

We proceeded to determine whether physical stabilization of whole blood samples improved the preservation of red blood cells. A distinctive feature of RBC aging is characterized by the loss of biconcave disc morphology and emergence of spiculations, termed echinocytes (FIG. 3A). We quantified the percentage of echinocytes as a result of storage in settled whole blood or Ficoll®-stabilized blood (FIG. 3B). Echinocyte levels in whole blood increased from 6.6±11.6% at 0 hour to 52.2±25.4%, 63.2±25.9%, and 78.8±21.1% at 24, 48, and 72 hours respectively. Addition of 5%, 10%, or 15% F70 significantly decreased echinocyte levels post-storage (FIG. 3B; $p<0.05$, $<0.01$, $<0.001$ for 5% F70 vs. WB at 24, 48, & 72 hours, respectively; $p<0.001$ for 10% or 15% F70 vs. WB at 24, 48, & 72 hours). Addition of only RPMI (0% F70) had no effect on echinocyte formation as expected ($p>0.05$ at all timepoints).

Example 1.3 Compatibility with Leukocyte Enrichment Methodologies

Many assays involving blood cells require enrichment steps that isolate the desired populations in high purity. We determined whether F70-stabilized blood is compatible with common techniques for leukocyte enrichment. We found that F70 did not affect routine hypotonic lysis of RBCs and resulted in leukocyte yields comparable to whole blood samples (46.7±1.8% for WB vs. 43.9±1.9% for 10% F70, n=3 each, p=0.2). Flow cytometric analysis indicated no alteration on the expression of the leukocyte marker, CD45 (relative fluorescence, $54\pm13\times10^3$ for WB vs. $56\pm21\times10^3$ for 10% F70, n=6 each, p=1.0), suggesting compatibility with common surface antigen-based enrichment techniques. We further tested an immunomagnetic negative selection assay for neutrophil enrichment and obtained yield (30.7%±8.2% for WB vs. 29.2%±10.5% for 10% F70, n=4 each, p=0.89) and purity (99.0%±1.0% for WB vs. 99.0%±0.8% for 10% F70, n=4 each, p=1.0) comparable to whole blood. Importantly, treatment with Ficoll® did not activate neutrophils (CD11b relative fluorescence, $123\pm36\times10^3$ for WB vs. $123\pm15\times10^3$ for 10% F70, n 4 each, p=0.89).

Example 1.4 Leukocyte Preservation

Figure 4:
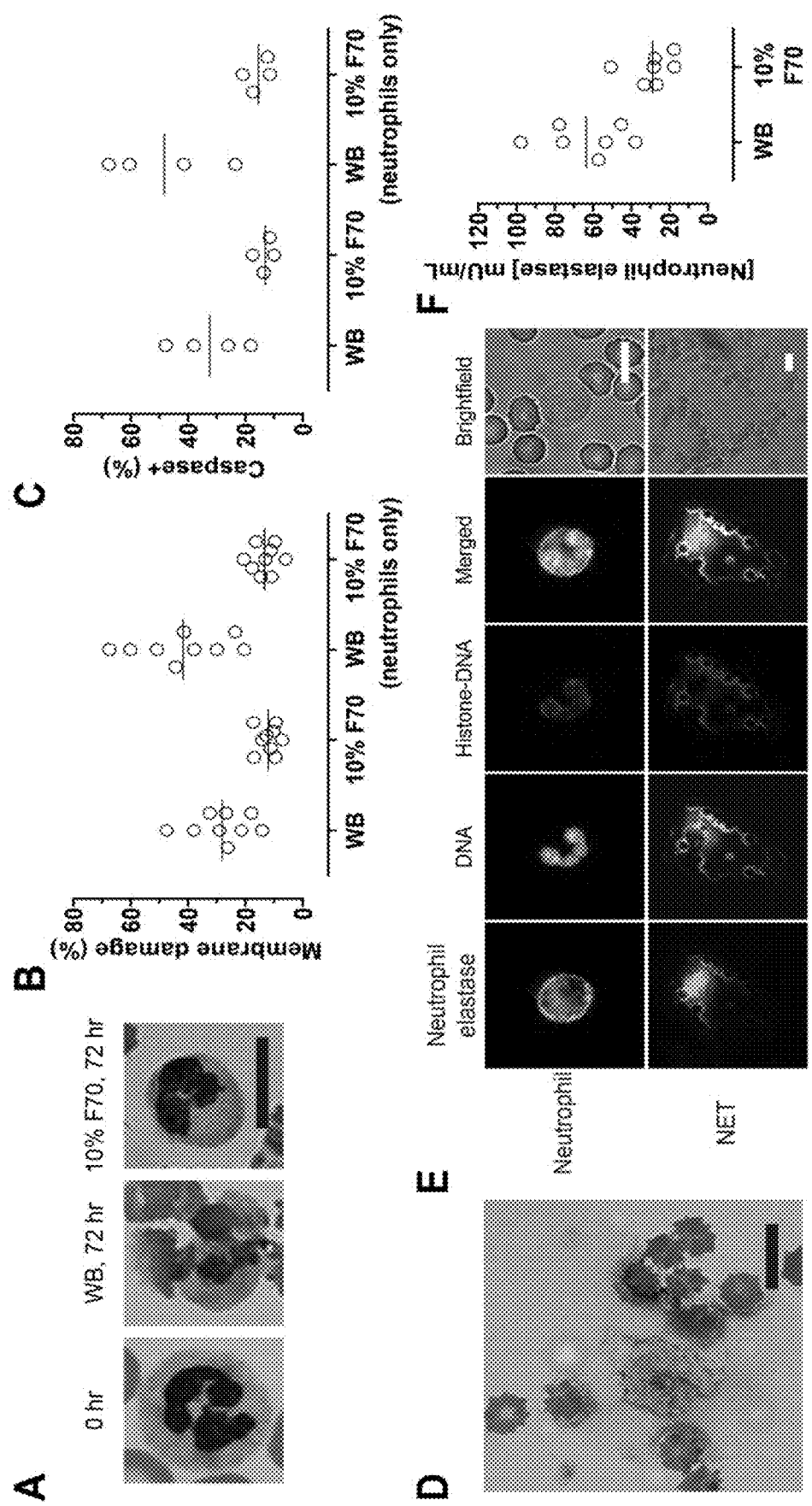
FIGS. 4A-4F.

To test whether physical stabilization improved leukocyte preservation, we observed the morphology of leukocytes on Wright-Giemsa-stained blood smears and assayed cell viability using flow cytometry. Neutrophils and their distinct multilobular nuclear morphology showed clear signs of disintegration after storage in whole blood for 72 hours. In comparison, neutrophil morphology was better preserved in Ficoll®-stabilized blood (FIG. 4A). To study events related to cell death, we performed imaging flow cytometry using stains that identify membrane-compromised (Sytox Blue) as well as apoptotic (positive for caspase-3/7 activity) cells. After 72 hours of storage in whole blood, 28.2%±10.2% of leukocytes stained positive for Sytox (FIG. 4B) and 32.5%±13.1% were positive for caspase activity (FIG. 4C). In contrast, leukocytes in blood stabilized with 10% F70 were minimally damaged (12.1%±3.5% membrane damage; p=0.0009 compared to WB; FIG. 4B) and much less apoptotic (13.2%±3.3% caspase positive; p=0.0286 compared to WB; FIG. 4C). These preservation benefits were particularly apparent on the fragile neutrophils. In whole blood, 41.8%±15.9% of neutrophils were membrane-compromised (FIG. 4B) and 48.3%±19.9% were caspase-positive (FIG. 4C); these values were compared to 13.4%±4.5% (p<0.0001; FIG. 4B) and 15.6%±4.5% (p=0.0286; FIG. 4C), respectively, in Ficoll®-stabilized blood. More than 93% of Sytox-positive cells also stained positive for caspase activity, indicating that majority of cells died by apoptosis.

Recently, neutrophil extracellular traps (NETs) have been found in stored red blood cell units that were not leukoreduced (17). The evident degradation of neutrophils led us to investigate NET formation. On blood smears obtained from stored samples, we observed highly dispersed nuclear materials that often span a large area (FIG. 4D), suggesting the formation of NETs. Immunofluorescence staining with the neutrophil-specific marker neutrophil elastase as well as the histone-DNA complex (FIG. 5B) confirmed the presence of NETs in stored blood samples (FIG. 4E) (18). To quantify the extent of NETosis, we measured the plasma levels of neutrophil elastase post-storage with ELISA. We found a 2.2-fold difference in elastase in WB compared to 10% F70 at 72 hours (63.6±21.1 mU/mL vs. 29±11.2 mU/mL; p=0.0023; FIG. 4F).

Example 2: Erythrocyte and Leukocyte Stabilization in Whole Blood Under Ambient Conditions Current erythrocyte preservatives, such as CPD and AS-1, require leukoreduction within 24 h of blood collection, followed by storage of erythrocytes at 4C. Furthermore, to the present inventors' knowledge, these solutions have not been validated against patient samples, which tend to degrade more rapidly (based on our experience with metastatic breast cancer patient samples). Whole blood preservatives currently on the market (such as CellSave) utilize fixatives to stabilize cellular membranes and proteins. Fixation results in cell death and complicates RNA extraction. Therefore, the present example describes the development of preservatives to stabilize viable erythrocytes in whole blood patient samples, and to preserve viable leukocytes in whole blood. Both methods have been optimized to stabilize samples under ambient conditions to facilitate sample shipment.

Materials and Methods

The following Materials and Methods were used in Example 2.

Development of formulation to preserve erythrocytes in healthy donor whole blood under ambient conditions. The initial formulation, referred to as CS-original** (cocktail solution original), was developed to stabilize erythrocytes from healthy donor whole blood (Table 1). CS was prepared in water and added to blood collected in ACD anticoagulant tubes at a ratio of 17:3 blood:preservative. The concentration noted in Table 1 was the final concentration of preservative component in the blood. Following addition of the preservative, samples are gassed with blood gas (5% 02, 5% CO2) and sealed. Samples were then stored at 21° C. for the desired amount of time (24-96 h). After the storage period, a 20 mM solution of adenosine is added to blood so that the final concentration is 2 mM. The blood was then incubated at 37° C. for 4 h, with intermittent mixing to facilitate revitalization of erythrocyte shape. Samples were then optically examined to quantify the number of echinocytes (irregular or damaged erythrocytes).

TABLE 1

| Experiment | HEPES (mM) | Adenine (mM) | Mannitol (mM) | NALC (mM) | Dextrose (mM) | NaCl (mM) |
|---|---|---|---|---|---|---|
| 1 | 24 | 0.11 | 2.25 | 0.385 | 0 | 0 |
| 2 | 24 | 0.11 | 4.5 | 0.77 | 7 | 8.5 |
| 3 | 24 | 0.11 | 6.75 | 1.54 | 13.5 | 17 |
| 4 | 24 | 0.22 | 2.25 | 0.385 | 7 | 8.5 |
| 5 | 24 | 0.22 | 4.5 | 0.77 | 13.5 | 17 |
| 6 | 24 | 0.22 | 6.75 | 1.54 | 0 | 0 |
| 7 | 24 | 0.44 | 2.25 | 0.77 | 0 | 17 |
| 8 | 24 | 0.44 | 4.5 | 1.54 | 7 | 8.5 |
| 9 | 24 | 0.44 | 6.75 | 0.385 | 13.5 | 8.5 |
| 10 | 48 | 0.11 | 2.25 | 1.54 | 13.5 | 8.5 |
| 11 | 48 | 0.11 | 4.5 | 0.385 | 0 | 17 |
| 12 | 48 | 0.11 | 6.75 | 0.77 | 7 | 0 |
| 13 | 48 | 0.22 | 2.25 | 0.77 | 13.5 | 0 |
| 14 | 48 | 0.22 | 4.5 | 1.54 | 0 | 8.5 |
| 15 | 48 | 0.22 | 6.75 | 0.385 | 7 | 17 |
| 16 | 48 | 0.44 | 2.25 | 1.54 | 7 | 17 |
| 17 | 48 | 0.44 | 4.5 | 0.385 | 13.5 | 0 |
| 18 | 48 | 0.44 | 6.75 | 0.77 | 0 | 8.5 |
| CS-original | 24 mM | 0.22 mM | 4.5 mM | 0.77 mM | 13.5 mM | 17 mM |

Taguchi optimization of preservative formulation for patient erythrocyte stabilization. CS-original was optimized to stabilize erythrocytes in metastatic breast cancer patient blood. Table 1 shows the construction of a modified L18 orthogonal array according to Taguchi methods for design of experiments. HEPES stock solution (1M) is adjusted to pH 7.4 using sodium bicarbonate. Each formulation was examined as described above, including the 4 h adenosine revitalization step post-storage.

Examination of leukocyte degradation in whole blood stored under to ambient conditions. Peripheral healthy donor blood was collected in ACD anticoagulant tubes. Blood was divided into two 1 mL aliquots in order to examine leukocytes at 0 h and 72 h. To the 72 h sample, the blood was added to a 15 mL falcon tube and degassed with 5% $O_2$/5% $CO_2$/90% $N_2$ followed by storage in an airtight container in a dark cabinet under ambient conditions. The remaining 1 mL sample was processed using flow cytometry to establish the side scatter vs CD45 intensity. This test is frequently used in flow cytometry to discriminate the various leukocyte populations (neutrophils, lymphocytes, etc).

Evaluation of apoptosis and necrosis inhibitors as neutrophil preservatives. Neutrophils were isolated by negative selection from healthy donor whole blood using the recommended protocol and reagents from the Human Neutrophil Enrichment Kit (StemCell Technologies; Vancouver, British Columbia, Canada). Yield was determined by counting particles from 8-30 μm in diameter using a Coulter Counter Z1 (Beckman Coulter; Brea, Calif.). Neutrophils were stored in IMDM+20% FBS and were either untreated (control) or treated with 1.25 μL/mL DMSO (Sigma-Aldrich; St. Louis, Mo.), 5 μM Q-VD-OPh (Apex Bio; Houston, Tex.), 50 μM Necrostatin-1 (Cayman Chemical; Ann Arbor, Mich.), or 50 μM Boc-D-FMK Apex Bio; Houston, Tex.). Matched samples were processed immediately after isolation and after 24, 48, 72, and 96 hours of storage at 21° C. Samples were stained with R-phycoerythrin-conjugated Annexin V, SYTOX Green, Hoechst 33342 (all Life Technologies; Carlsbad, Calif.), and allophycocyanin-conjugated CD45 (Huntington Valley) and imaged using an ImageStream$^X$ Mk. II Imaging Flow Cytometer (Amnis Corporation; Seattle, Wash.).

Example 2.1 Taguchi Optimization of Preservative Formulation for Patient Erythrocyte Stabilization The CS-original formulation, designed to stabilize erythrocytes in healthy donor whole blood, was not effective when tested against metastatic breast cancer patient samples, which degrade rapidly. A modified Taguchi table (Table 1 above) was therefore constructed to guide the optimization of the CS formulation. The most promising formulation to date was condition 18 from the Taguchi table.

Figure 6C:
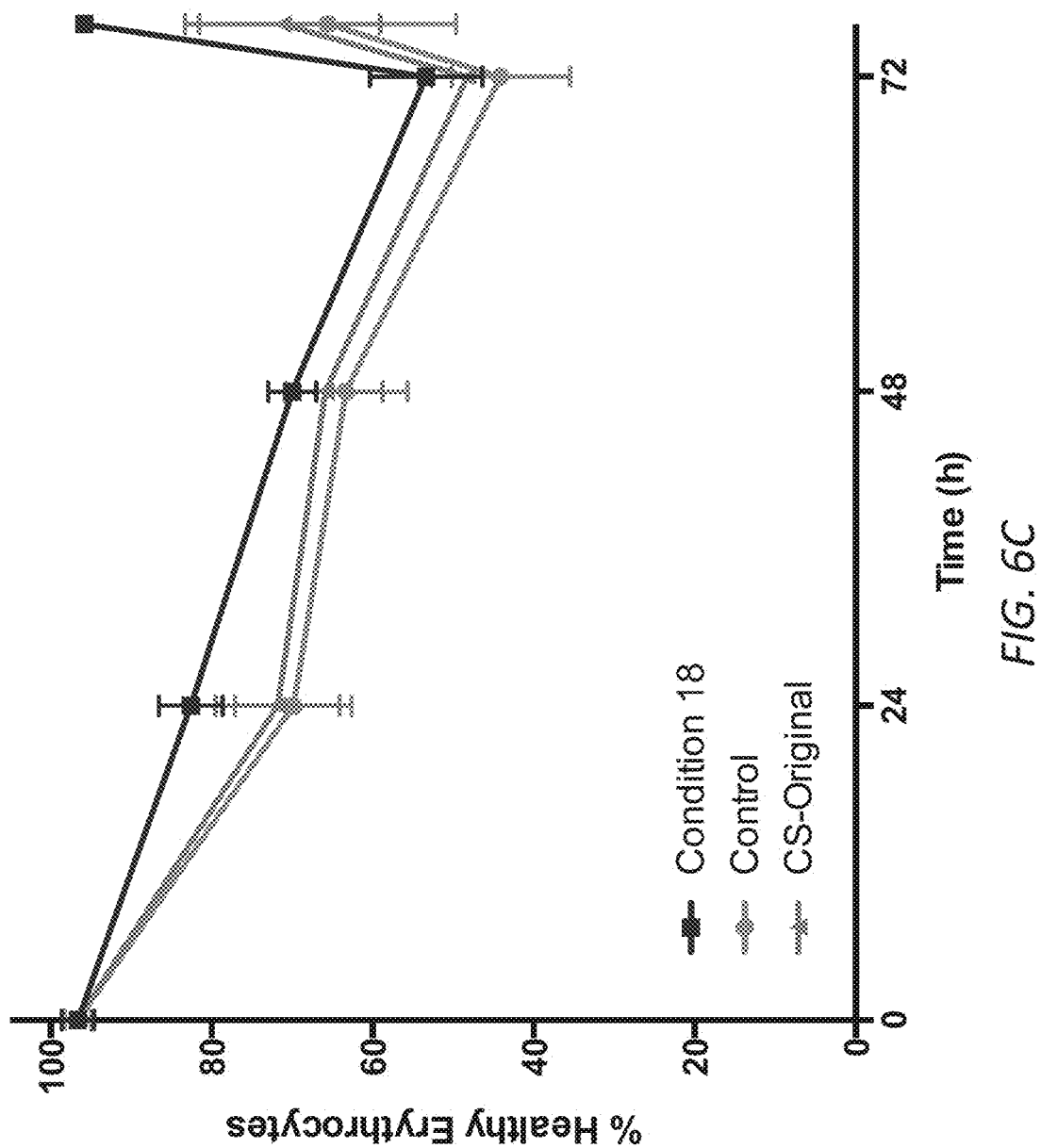

FIG. 6 reveals that this formulation offers superior abilities to revitalize erythrocytes following the adenosine treatment compared to the control and CS-Original samples (n=5, adenosine treated samples are plotted at 76 h).

Thus, the CS-Original formulation was sufficient for stabilizing erythrocytes from healthy donor samples (stored under ambient conditions as whole blood), but it is not ideal for stabilizing patient samples, which may degrade more rapidly. However, using modified Taguchi methods for design of experiments combined with a post-storage revitalization step (4 h incubation with adenosine), the formulation was optimized, resulting in superior protection of samples stored for 72 h (Condition 18, shown in FIG. 6).

Figure 7:
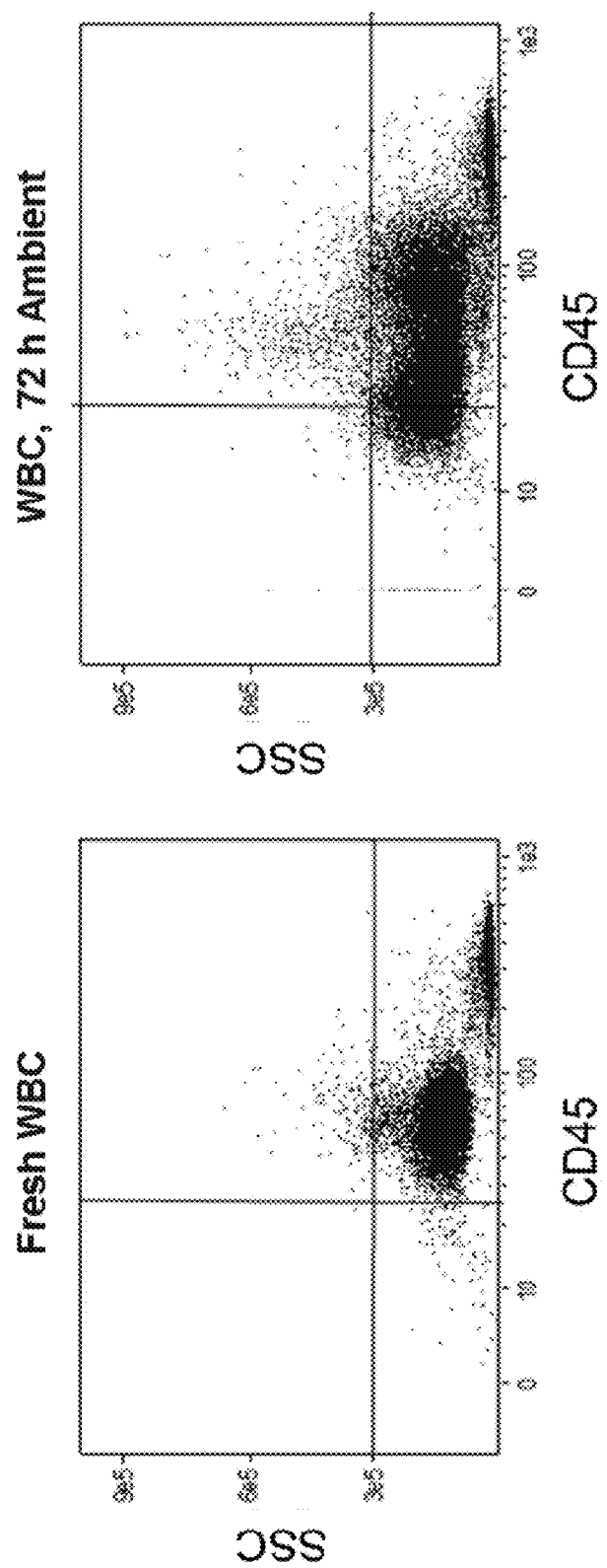
FIG. 7. The distribution of leukocytes in the side scatter v CD45 scatter plot was as expected, with obvious distinctions between each population of cells. However, after 72 h of ambient storage, the leukocyte population shifted. It was later determined that the majority of shifted cells were apoptotic/dead neutrophils.

Example 2.2 Extensive CD45 Biomarker Degradation is Observed in Leukocytes Stored Under Ambient Conditions Whole blood was collected and stored under ambient conditions for up to 72 h to determine the effects of storage on biomarker expression. FIG. 7 shows that the leukocytes stored under ambient conditions in CS-Original underwent significant decreases in CD45 expression compared to freshly examined leukocytes.

Q-VD-OPh, a broad spectrum caspase inhibitor with potent antiapoptotic properties (see Caserta et al., Apoptosis 2003; 8: 345-352), successfully stabilized neutrophils stored under ambient conditions. As neutrophils were known to deteriorate rapidly ex vivo, we suspected this population of cells was largely responsible for the fluorescent shifts observed in FIG. 7. Consequently, we simplified the experiments to examine isolated neutrophils stored in culture media (IMDM+20% FBS), rather than whole blood. This simplification allowed a more thorough and rapid evaluation of potential apoptosis/necrosis inhibitors. The apoptosis inhibitors Q-VD-OPh and Boc-D-fmk were selected based on their broad-spectrum caspase inhibitory activity. Q-VD-OPh has previously been reported as a powerful apoptosis inhibitor effective at low concentrations (5 uM). As FIGS. 8A-8I reveal, Q-VD-OPh was highly effective at apoptosis inhibition within the very sensitive neutrophil population, and it also acted to extend viability from ~24 h to 96 h under ambient storage conditions (it is worth noting that the control condition itself also has stabilizing effects on neutrophils, as experiments with HBSS or IMDM only resulted in more rapidly degrading neutrophils which were stable for <24 h). In addition, the Q-VD-OPh effectively preserved CD45 biomarker expression. Specifically as shown in FIG. 8C, after 96 h ambient storage the neutrophils are nearly indistinguishable from those examined immediately after collection. Alternatively, neutrophils from the same donor stored under control conditions, had undergone significant degradation at 96 h (FIG. 8B).

Example 2.3 Q-VD-OPh Preserves Neutrophil Function

Figure 9A:
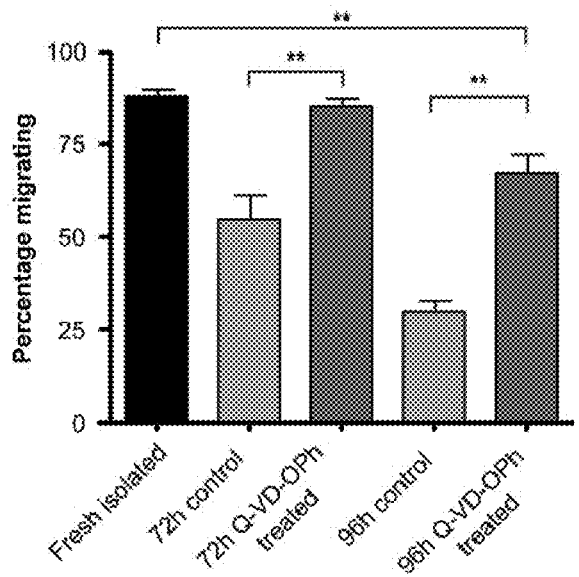
FIGS. 9A-9B. Neutrophils were stored under two conditions—high nutrient control conditions (IMDM+20% FBS), and Q-VD-OPh in IMDM+20% media.
Figure 9B:
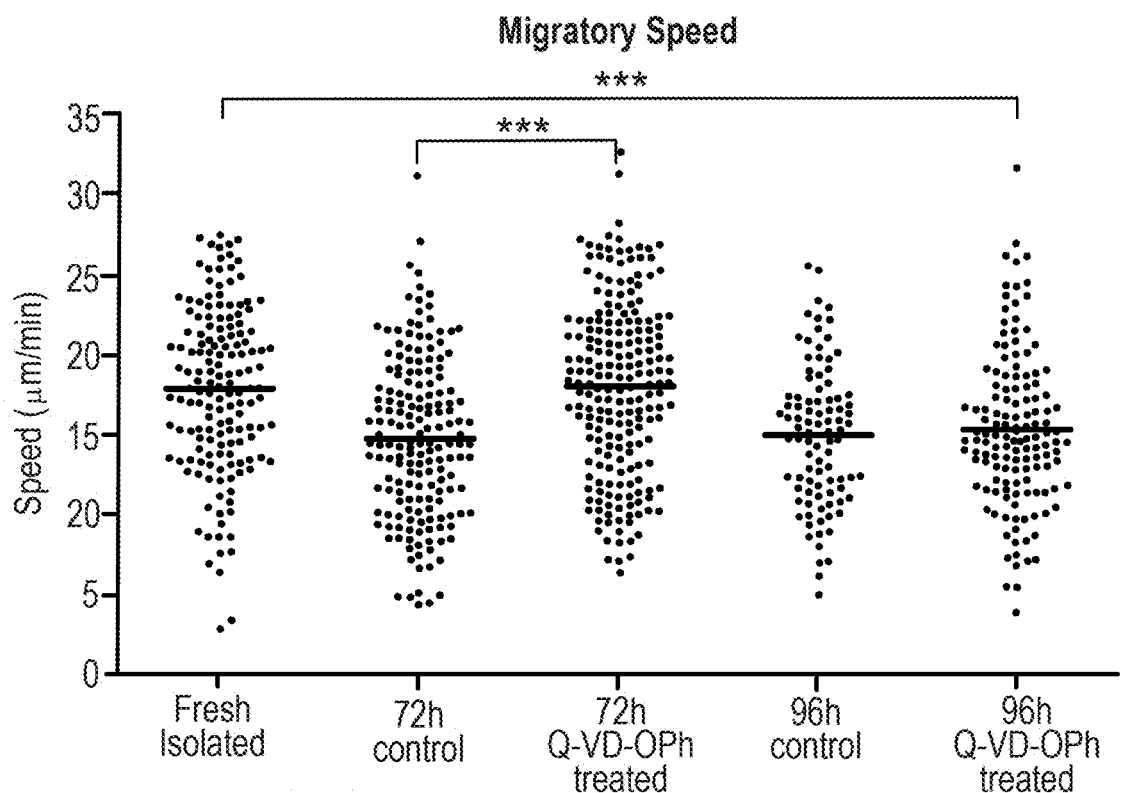

While the data in FIG. 8 demonstrates that Q-VD-OPh was capable of preserving the viability and CD45 biomarker expression of neutrophils stored under ambient conditions, it did not indicate whether these cells were still functional. To determine whether neutrophils stored under these conditions were still capable of migrating toward an fMLP gradient, we utilized a microfluidic device previously developed for this purpose. Briefly, fMLP, a neutrophil chemoattractant, is added to two outer chambers. The outer chambers are connected to an inner chamber through a series of channels, creating a gradient. The inner chamber was then filled with neutrophils. Freshly isolated neutrophils were immediately evaluated to establish a time 0 migratory response, then the preserved neutrophils were examined after 72 and 96 h ambient storage for comparison. FIG. 9A shows that the migratory response of the Q-VD-OPh treated sample was comparable to that of the freshly isolated neutrophils, whereas the control exhibited a significant decrease in function. FIG. 9B also demonstrates that the speed at which the neutrophils migrate toward the gradient is identical to the fresh neutrophils. This data indicates that Q-VD-OPh preserves neutrophil function.

Thus, the Q-VD-OPh treated neutrophils were stable under ambient storage conditions for 72-96 h. Furthermore, the viability and CD45 biomarker expression was stabilized for up to 96 h, a significant improvement upon untreated neutrophils.

Example 3. Cold Preservation of Whole Blood for the Isolation of CTCs

The Example describes the development of new strategies for the stabilization of whole blood. These methods can be used in samples intended for use in isolation of Circulating Tumor Cells (CTC), e.g., using a microfluidic device known as the CTC-iChip. The successful analysis of patient samples currently requires freshly collected blood as a result of the rapid deterioration of patient blood ex vivo. Consequently, the stabilization of whole blood would allow patient samples to be preserved during shipment to centralized facilities equipped for effective CTC isolation.

Materials and Methods

The following Materials and Methods were used in Example 3.

Sample Collection

Whole blood was collected from healthy subjects within the Massachusetts General Hospital or purchased from Research Blood Components (Brighton, Mass.). Subjects were not taking medications including those known to effect platelet function (e.g., nonsteroidal anti-inflammatory drugs or aspirin within 48 hours prior to phlebotomy). Subjects were asked to refrain from intensive exercise (at least 4 hours prior to phlebotomy) and were non-smokers. All blood was drawn into Acid Citrate Dextrose-A (ACD-A) tubes (BD Vacutainer; 8.5 mL) using 19-23 gage needles, although blood collection for platelet aggregometry used 19-21 gage needles exclusively. All blood was used within 3-4 hours of collection. Specimens were kept at room temperature (20 to 25° C.) without rocking for platelet aggregometry, while all other specimens were rocked.

Treatment of Blood Samples with Platelet Inhibitors and EDTA

Platelet inhibitors used include: Tirofiban (Sigma), Eptifibatide (Tocris), Clopidogrel (Sigma), KF38789 (Tocris). In all experimental conditions that involved treatment with platelet inhibitors (e.g., tirofiban, eptifibatide, etc.), these compounds were added to blood samples and mixed by gentle rocking for 10 minutes before the sample was processed for other assays or storage. The addition of EDTA, unless otherwise stated, occurred 15 minutes prior to the assay (i.e., EDTA was not present during sample storage).

Blood Smears

Peripheral blood smears were prepared manually using a wedge technique according to standard procedures. Blood was pipetted (~6 µl) onto a slide, evenly smeared using a second slide (at a 30-45° angle), and air dried. Blood smears were fixed with methanol (100%), stained with Giemsa-Wright stain (Sigma) for 30 seconds, and quickly transferred to distilled water before air drying. Slides were mounted with Permount before imaging using a Nikon Eclipse 90i microscope, a Nikon 100× Apo VC 100×/1.40 oil objective, and Nikon DS-Ri1 color camera (12-bit; 1280×1024 resolution). About 100 random RBCs were counted per sample and classified as either echinocytes (based on distinct thorny projections) or healthy RBCs.

Imaging Flow Cytometry

Platelet activation and cell viability were determined using the Image Stream Mark II imaging flow cytometer (Amnis Corporation) equipped with a 40× objective and the 405, 488, 642 nm lasers. For the platelet activation panel, 1 µl of whole blood was combined with PBS and fluorescently labeled antibodies as follows; Pacific Blue conjugated CD41 (1:150; clone HIP8; BioLegend), FITC conjugated PAC-1 (1:10; clone PAC-1 (RUO (GMP)); BD Pharmingen), PE conjugated CD62P (1:100; clone AK-4; BD Pharmingen), APC conjugated CD63 (1:10; clone H5C6; Biolegend), PE/Cy7 conjugated CD45 (1:100; clone HI30; Abcam). For white blood cell viability panel, 6 µl of whole blood was combined with 194 µl RPMI (containing Hepes) and fluorescently labeled antibodies/viability stains as follows; calcein blue AM (10 µM; Life Technologies), CellEvent™ Caspase-3/7 Green (5 µM; Life Technologies), PE conjugated CD66b (1:125, clone g10f5, Stemcell Technologies), PE-cf594 conjugated CD45 (1:400, clone HI30, BD Pharmingen). For the detection of viability of rare cells in whole blood, androgen-sensitive prostate adenocarcinoma cells (LNCaP) or lines derived from breast cancer patients, as described in Yu et al (2014)[2], were spiked into whole blood at 300,000 cells/mL. The processing of rare cells for imaging flow cytometry followed the same procedure as described above for white blood cell viability with the following exceptions; PE conjugated EpCAM (1:250, clone VU1D9, Cell Signaling Technology). For the WBC activation panel, 6 μl of whole blood was combined with 194 μl Hepes and fluorescently labeled antibodies as follows; Pacific Blue conjugated CD41 (1:100; clone HIP8; BioLegend), Alexa Fluor 488 conjugated CD11b (1:500; clone ICFR44; Stemcell Technology), PE conjugated CD11a (1:20; clone 38; Abd Serotec), PE-cf594 conjugated CD45 (1:800; clone HI30, BD Pharmingen), DRAQ5 (1:1000; Life Technologies).

Aggregometry

Lyophilized collagen (soluble calf skin), thrombin, and ristocetin were obtained from Chrono-Log Corporation (Havertown, Pa.) and reconstituted using sterile distilled water. Aggregation experiments were performed in whole blood using electrical impedance on a two channel Chrono-Log 700 Series Whole Blood/Optical Lumi-Aggregometer and analyzed using AGGRO/LINK8 software. Whole blood was incubated at 37° C. for 5 min and each sample was run for 10 min after addition of the agonist with a stir bar speed of 1200 rpm. Agonist concentrations for collagen, ristocetin, and thrombin were 2 ug/mL, 1 mg/mL, 1 Unit/mL, respectively. Collected data included maximal aggregation (%), slope of the aggregation curve, area under the curve at 6 mM as well as elapsed time between addition of agonist and onset of aggregation (lag phase).

Microfluidic Isolation of Spiked Circulating Tumor Cells

Treatment of Blood Samples with Platelet Inhibitors and Storage Conditions

Cultured tumor cell lines (VCaP, LNCaP, or a CTC line derived from a breast cancer patient) were spiked into healthy donor blood samples at 2000-3000 cells per milliliter of blood. After that, the blood sample was divided into appropriate volumes and treated with the platelet inhibitors tirofiban (0.5 or 1 μg/mL) or eptifibatide (20 μg/mL), before they were immediately stored or proceed to microfluidic processing. Samples were stored under room temperature or 4° C., protected from light and without rocking. The platelet inhibitor cocktail included EDTA (2-5 mM) which was added to the blood samples 15 minutes prior to microfluidic processing. 5-6 mL of blood samples were processed per experimental condition.

Microfluidic Sorting Using the CTC-iChip

Isolation of spiked tumor cells were performed using the CTC-iChip previously published (Ozkumur et al. 2013. Sci. Transl. Med. 5(179):179ra471; Karabacak et al. 2014. Nat. Protoc. 9(3):694-710) with slight modifications that further enhance throughput and purity. Briefly, the spiked whole blood was incubated with biotinylated CD45, CD66b, and CD16 antibodies, followed by the addition of streptavidin-coupled Dynabeads (Invitrogen), before it was loaded into a pressurized syringe for processing in the CTC-iChip. In the iChip, the blood first passes through a filtration array which removes large aggregates and then reaches the hydrodynamic sorting stage which removes plasma, platelets, and red blood cells based on size. The enriched nucleated cells were then aligned into a single line such that the Dynabead-targeted leukocytes were effectively depleted by magnetophoresis. Finally, the enriched tumor cells underwent a second hydrodynamic sorting array which removes residual platelets and red blood cells. The remaining highly enriched tumor cells were then collected in the product outlet in PBS buffer containing 1% Pluronic. Enumeration of spiked cells and carryover of leukocytes was performed according to published protocols (Karabacak et al. 2014. Nat. Protoc. 9(3):694-710).

In Vitro Culture of a Circulating Tumor Cell Line Post-iChip Processing

A breast CTC line labeled with luciferase was used for the quantification of cell growth (Yu et al. 2014. Science. 345(6193):216-20). The blood sample was spiked with 3000 CTCs/mL of blood, and 6 mL of blood was processed by the iChip. The enriched CTC product was then spun down, resuspended in 2 mL of CTC culture media (Yu et al. 2014), and cultured in low-adhesion 24-well plates at 500 μL per well (4 wells total). On the day of assay, 400 μL of cells from the well and the number of viable cells was determined using the Bright-Glo Luciferase Assay System (Promega) according to manufacturer's protocol. Luminescence signal was measured using a SpectraMax M5 Microplate Reader (Molecular Devices). As a positive control, cells from the same CTC line was cultured directly and assayed with the same method, without any spiking processes in blood or iChip sorting. These cells were adjusted to 4500 cells in 500 μL media and cultured in the same plates.

RNA Extraction and RNA Quality Assessment

Total RNA was extracted from WBCs after selective lysis of RBCs using standard protocols. Briefly, 1 volume of blood was combined with 5 volumes of EL Buffer (QIAGEN), incubated on ice for 15 min, vortexed, centrifuged (400× g, 10 min, 4° C.), and the supernatant removed. WBCs were resuspended in 250 μl of PBS (per 1 mL starting blood) and combined with 750 μl of TRIzol® LS Reagent. Following incubation for 5 min at room temperature, 200 μl of chloroform was added and vortexed vigorously with intermittent incubation at room temperature. Samples were centrifuged at 12,000×g for 15 min (4° C.) and the aqueous layer removed before precipitation with 100% isopropanol. Finally, samples were centrifuged at 12,000×g for 10 min (4° C.) and the pellet washed with 75% ethanol, air dried, and resuspended in TE buffer. RNA concentrations were determined by reading absorbance at 260 nm on a spectrophotometer using the ratio of absorbance at 260/280 nm as an indicator of RNA purity (A2601280 ratio=1.8-2). RNA quality and RIN values were determined using a Bioanalyzer and RNA Pico Kit (Agilent Technologies), as per standard protocols.

Example 3.1 Platelet Activation as a Function of Temperature

Platelets were tested at various temperatures in order to understand the relationship between cold storage and platelet activation. These experiments were also performed in order to identify the best temperature for storage whereby platelet activation could be minimized with maximal preservation of whole blood components.

The data, presented in FIG. 10, shows that cold-induced activation of platelets (as evidenced by % PAC-1 Activation, left graph) is associated with two surface proteins, CD62/p-selectin and GPIIa/IIIa, and that the largest changes in platelet activation occur between 37 and 22° C.

Example 3.2 Optimization/Selection of Various Platelet Inhibitors

It was hypothesized that surface markers identified above, CD62/p-selectin and GPIIa/IIIa, play a critical role in platelet aggregates which clog microchannels of the CTC-iChip. CD62/p-selectin is associated with degranulation—a process that leads to the recruitment and activation of surrounding platelets; suggesting inhibition would impede signaling to nearby platelets and minimize signal amplification. Furthermore, activated GPIIb/IIIa and CD62/p-selectin mediate platelet-platelet, platelet-leukocyte, and platelet-CTC interactions, and interact with the microfluidic device itself, resulting in improper cell sorting, clogging, and slow flow rates. As a result, we tested a range of platelet inhibitors including Tirofiban (Sigma), eptifibatide (Tocris), Clopidogrel (Sigma), KF38789 (Tocris).

Figure 11:
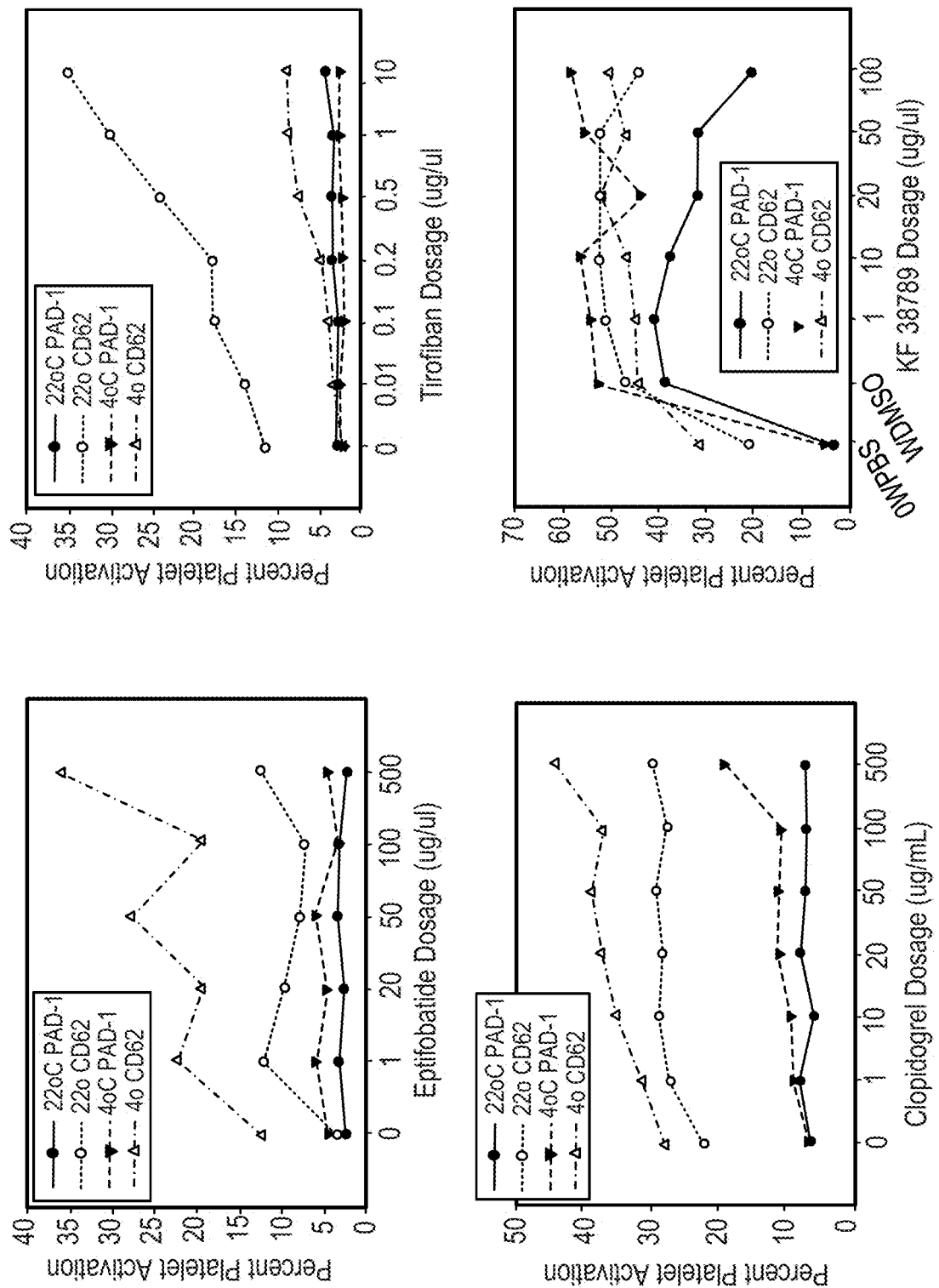
FIG. 11. Optimization/selection of various platelet inhibitors. We tested a range of platelet inhibitors including Tirofiban, Eptifibatide (Tocris), Clopidogrel (Sigma), and KF38789 (Tocris) at a range of concentrations. Platelets were incubated for 20 min at either 4 or 22° C. prior to staining for platelet activation surface markers and processing using imaging flow cytometry. Platelet activation was determined by assessing the percent of platelets which express cell surface markers including PAC-1 and CD62/p-selectin. Of the platelet inhibitors tested, Tirofiban showed the most promising results whereby cold treated platelets were minimally activated at dosages ranging from 0.01-0.5 ug/mL.

The data, presented in FIG. 11, showed that increasing dosages of platelet inhibitors can cause platelet activation in and of itself, and increasing dosages of platelet inhibitors can increase the amount of platelet-leukocyte interactions. In addition, the dosage response of platelet inhibitors and activation was temperature dependent. Of the platelet inhibitors tested, Tirofiban showed the most promising results whereby cold treated platelets were minimally activated at dosages ranging from 0.01-0.5 ug/mL.

Example 3.3 Non-Toxic Platelet Inhibitor Cocktail

Figure 12C:
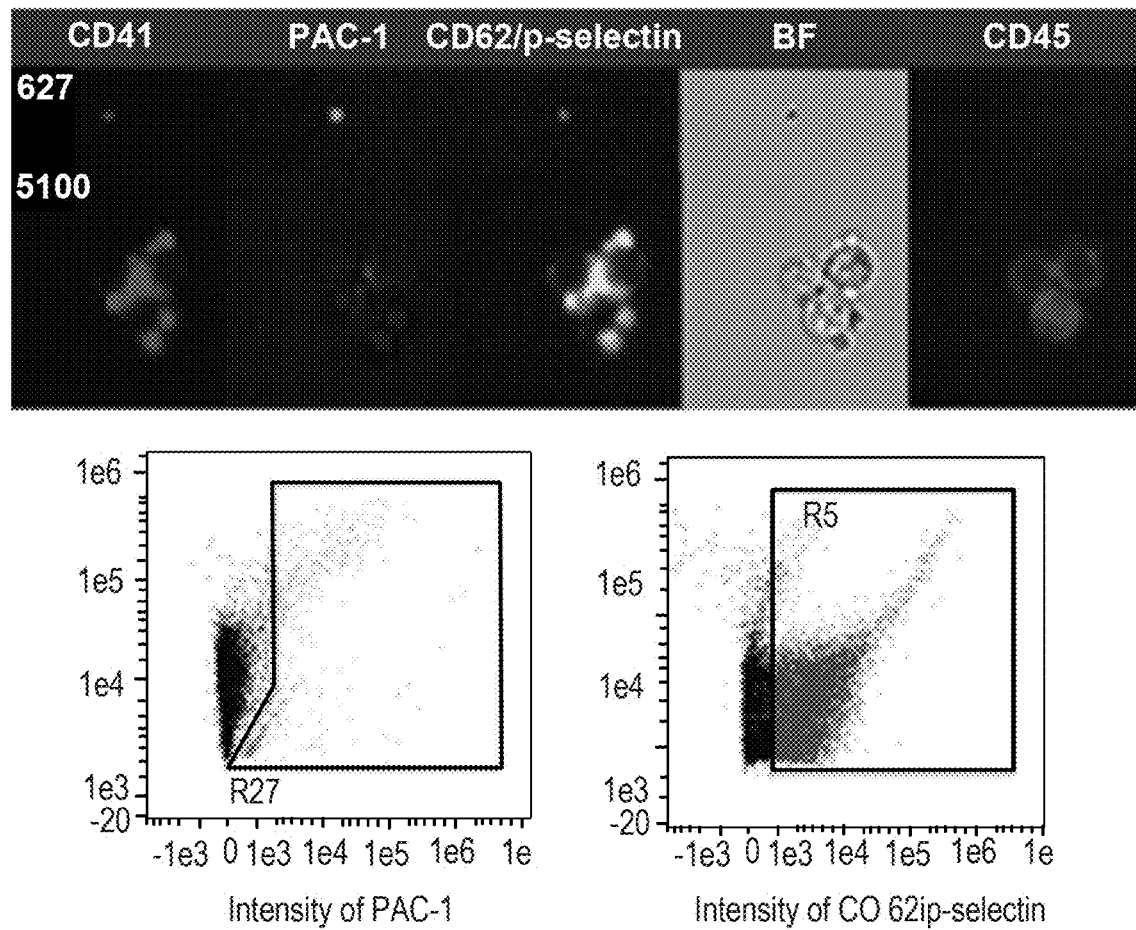
Figure 12D:
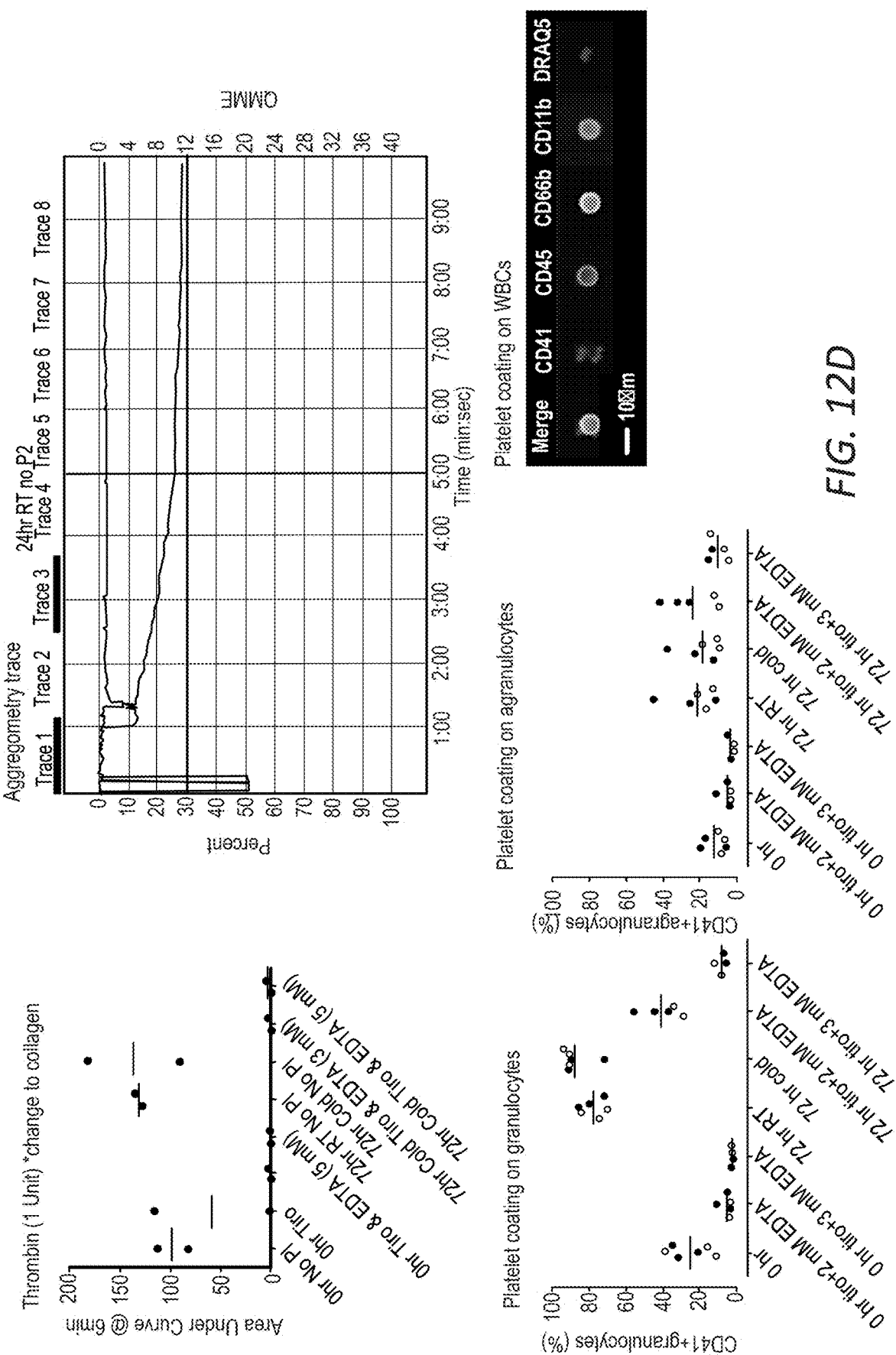

We measured the effect of an optimized platelet inhibitor cocktail (containing 0.1-0.5 ug/mL and 2-5 mM EDTA) on the expression of activation markers and function of platelets after 72 hr cold or room temperature storage of whole blood. The data is presented in FIGS. 12A-12D. PAC-1 expression (the active form of GPIIa/IIIa) was enhanced in cold stored blood and this could be reversed with our platelet inhibitor cocktail (FIGS. 12A, 12C). CD62P expression was enhanced during storage, but the platelet inhibitor cocktail did not reverse cell surface expression (FIGS. 12B, 12C). While CD62P cell surface expression was not reversed, the platelet inhibitor cocktail could completely reverse platelet-leukocyte interactions, especially for the granulocyte population, and the platelet inhibitor cocktail completely inhibits platelet aggregation/function (FIG. 12D).

Example 3.4 Preservation of RBC Morphology During Cold Preservation

Within hours of blood collection, spherical, spiculated erythrocytes—known as echinocytes—are observed in blood. Echinocytes are commonly observed in ex vivo blood samples and are an indicator of cellular stress. Echinocytes present major complications for microfluidic applications that rely on the specific size, shape and flexibility of the cells to enable efficient, rapid sorting. As erythrocytes account for 99% of blood volume, these structural changes significantly interfere with microfluidic processes in CTC isolation, as these spherical echinocytes are deflected like nucleated cells in hydrodynamic cell sorting platforms.

Figure 13:
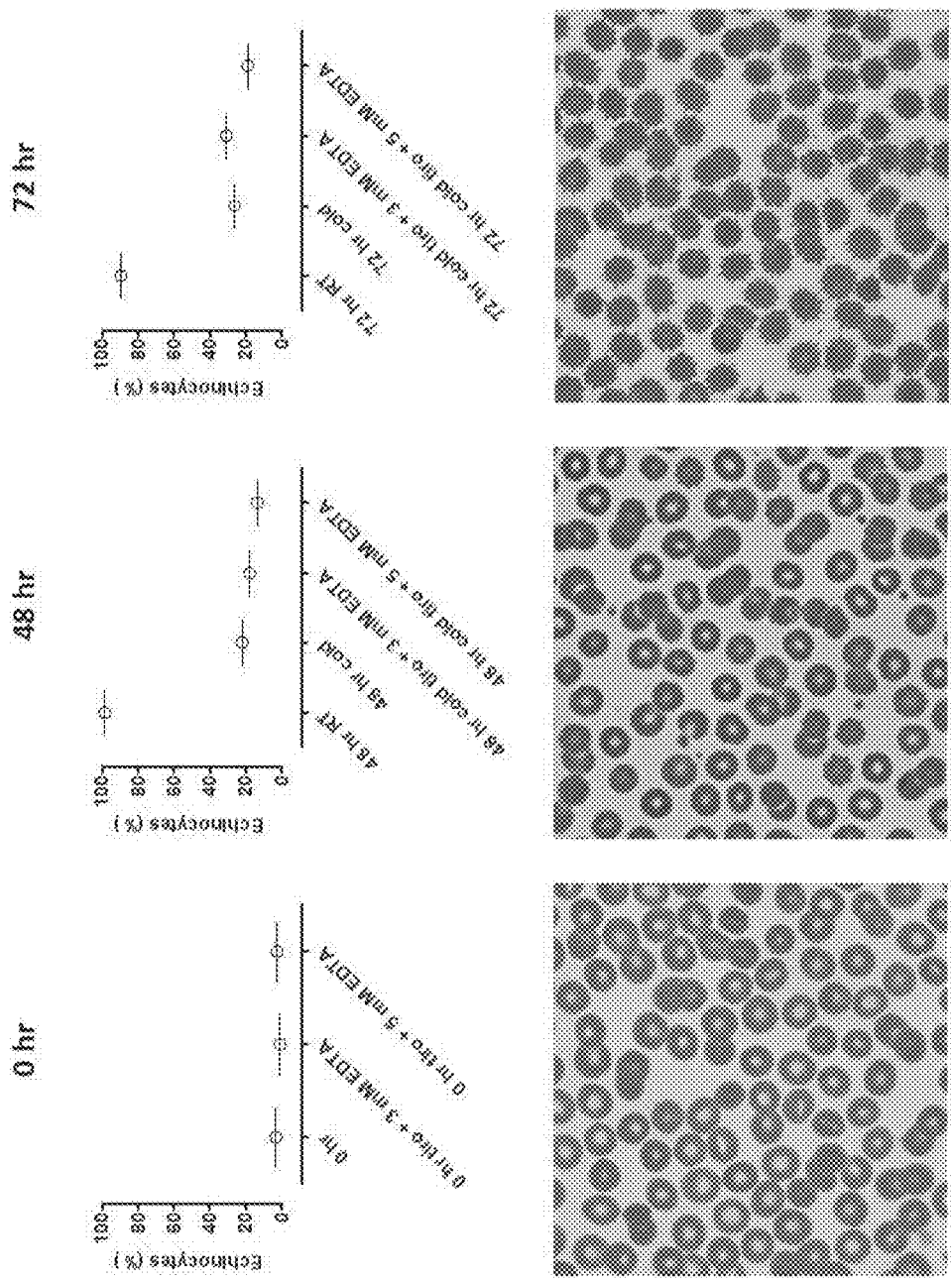
FIG. 13. Preservation of RBC morphology during cold preservation. Echinocytes, RBCs with distinct speculated shapes, are commonly observed in ex vivo blood samples and are an indicator of cellular stress. Echinocyte counts were obtained using standard blood smears, phase contrast imaging (using 100× objective), and counting 100 RBCs across two images (captured from different fields) per experimental condition. The data compares 0 hr versus cold and room temperature 72 hr storage with and without platelet inhibitor cocktail (Tirofiban 0.1-0.5 ug/mL added before storage; EDTA 2-5 mM added after storage). Whole blood cold storage can preserve the morphology of up to 80% of RBCs for up to 72 hrs. The addition of our platelet inhibitor cocktail does not have any deleterious effect on echinocyte formation.
Figure 14:
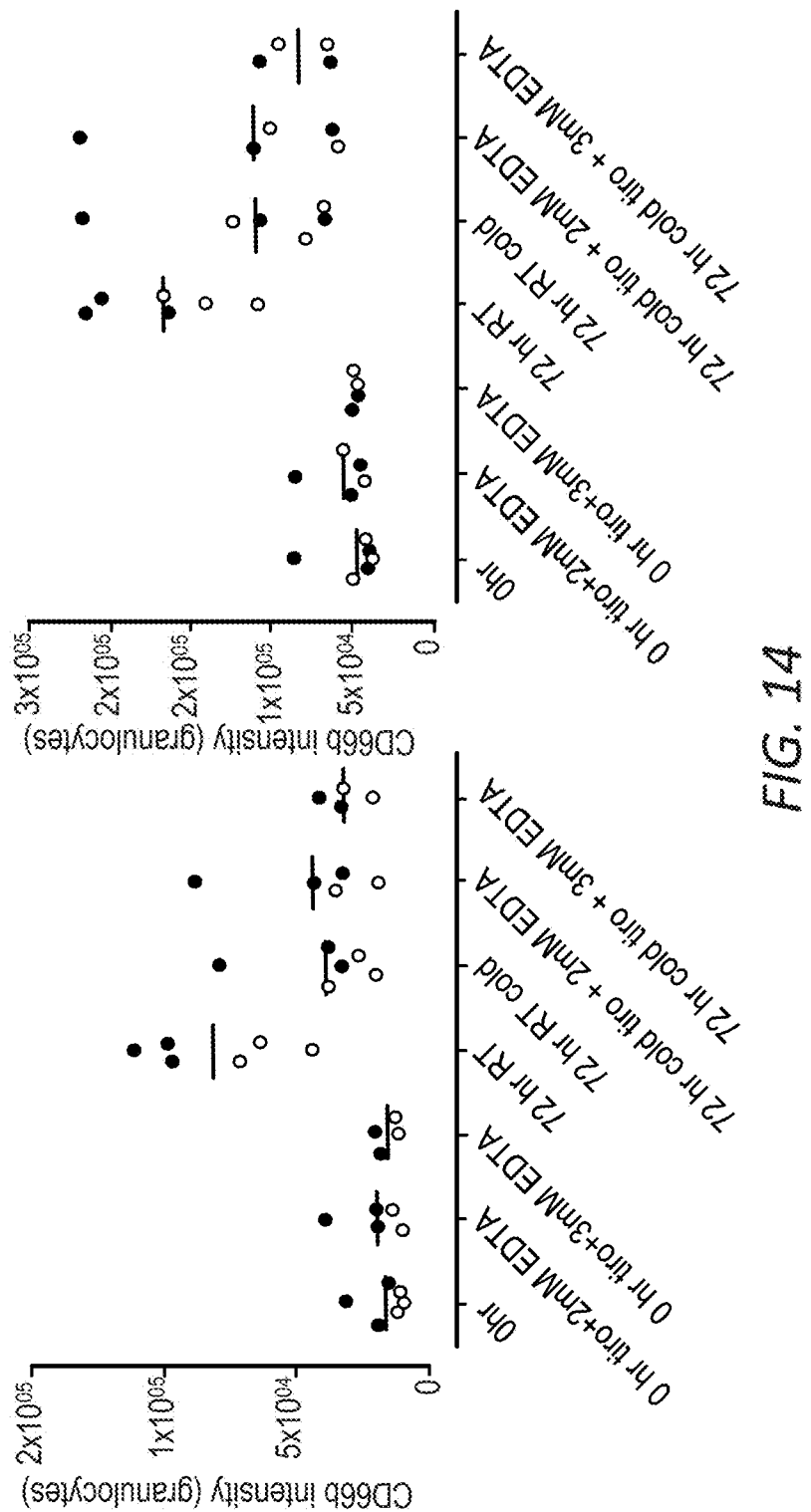
FIG. 14. WBC Activation during cold storage. Using imaging flow cytometry, the percent WBC activation was determined using cell surface markers of activation including CD66b and CD11a. The data compares 0 hr versus cold and room temperature 72 hr storage with and without platelet inhibitor cocktail (Tirofiban 0.1-0.5 ug/mL added ten minutes before storage; EDTA 2-5 mM added after storage). Shaded data points indicate data collected from healthy donors, while open circles indicate data collected from cancer patients. WBC activation is reduced in cold storage, as compared to room temperature storage. The addition of our platelet inhibitor cocktail does not activate WBCs. These trends are observed in healthy donors and cancer patients.

As shown in FIG. 13, comparing cold versus room temperature storage of whole blood for up to 72 hr, cold storage can preserve the morphology of up to 80% of RBCs. Also, the addition of the platelet inhibitor cocktail (tirofiban plus EDTA) does not have any deleterious effect on echinocyte formation Example 3.5 WBC Activation During Cold Storage Given the effect of cold storage on platelet activation, we also measured the effect of cold storage on the activation of WBCs. The data showed that WBC activation is reduced in cold storage, as compare to room temperature storage. In addition, the addition of a platelet inhibitor cocktail (tirofiban plus EDTA) did not activate WBCs. These trends were observed both in healthy donors and cancer patients. See FIG. 14.

Example 3.6 Preservation of WBC Viability During 72 hr Cold Storage

Figure 15:
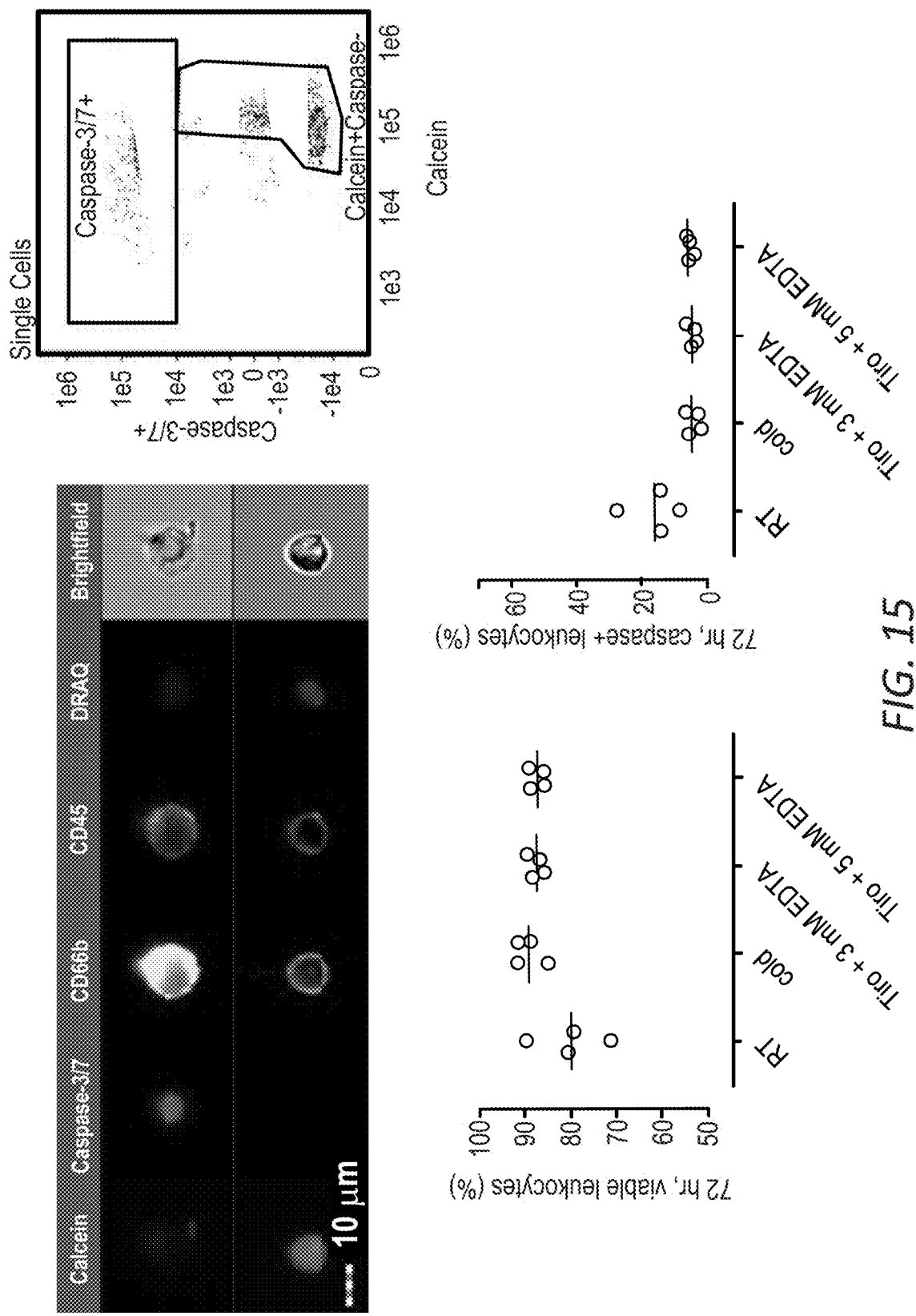
FIG. 15. Preservation of WBC viability during 72 hr cold storage. The viability of cold versus room temperature stored WBCs was assessed using live (Calcein AM blue) and dead (Caspase 3/7) stains by imaging flow cytometry. Viable cells are defined as calcein positive and caspase negative cells, while dead cells are defined as caspase positive cells. Granulocytes were gated based on low CD45 and high CD16 expression, while agranulocytes exhibited high CD45 expression. The data compares 0 hr versus cold and room temperature 72 hr storage with and without platelet inhibitor cocktail (Tirofiban 0.1-0.5 ug/mL added ten minutes before storage; EDTA 2-5 mM added after storage). The viability of WBCs stored in the cold is better than room temperature stored blood. The addition of the platelet inhibitor cocktail has no effect on WBC viability.

Using imaging flow cytometry, we measured the viability of cold versus room temperature stored WBCs using live (calcein blue) and dead (caspase 3/7) stains. The results, presented in FIG. 15, showed that the viability of WBCs stored in the cold was better than room temperature stored blood. The addition of the platelet inhibitor cocktail had no effect on WBC viability.

Example 3.7 Preservation of WBC RNA Integrity During 72 hr Cold Storage

While WBC viability was enhanced in cold (Example 3.6, FIG. 15), we also measured the RNA integrity of stored blood. Since RNA is one of the most sensitive biological materials, we view this as a robust marker of preservation. The results showed that RNA integrity at 48 hr storage was similar for room temperature and cold stored blood, and that after 72 hr storage, cold stored RNA remained intact, while room temperature stored blood was severely degraded.

Example 3.8 LNCaP Viability During Cold Storage

Figure 16:
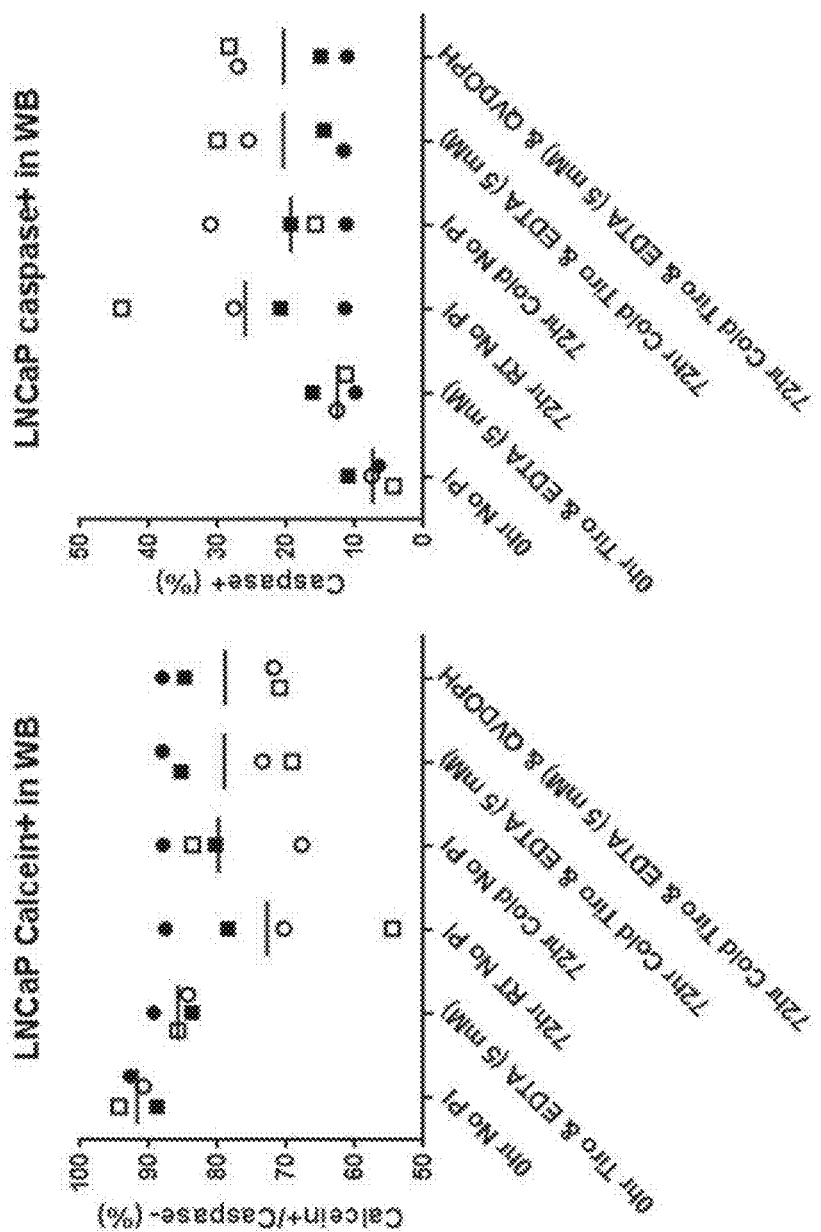
FIG. 16. LNCaP viability during cold storage. The viability of cold versus room temperature stored rare cancer cells was assessed using live (Calcein AM blue) and dead (Caspase 3/7) stains by imaging flow cytometry. Viable cells are defined as calcein positive and caspase negative cells, while dead cells are defined as caspase positive cells. LNCaP cells were gated using EpCAM cell surface markers. The data compares 0 hr versus cold and room temperature 72 hr storage with and without platelet inhibitor cocktail (Tirofiban 0.1-0.5 ug/mL added ten minutes before storage; EDTA 2-5 mM added after storage). No PI indicates no platelet inhibitor was added to the sample. Shaded data points indicate data collected from healthy donors, while open circles indicate data collected from cancer patients. The viability of rare cells stored in the cold is possibly better than room temperature stored blood. The addition of the platelet inhibitor cocktail has no effect on rare cell viability. These trends are observed in healthy donors and cancer patients.
Figure 17:
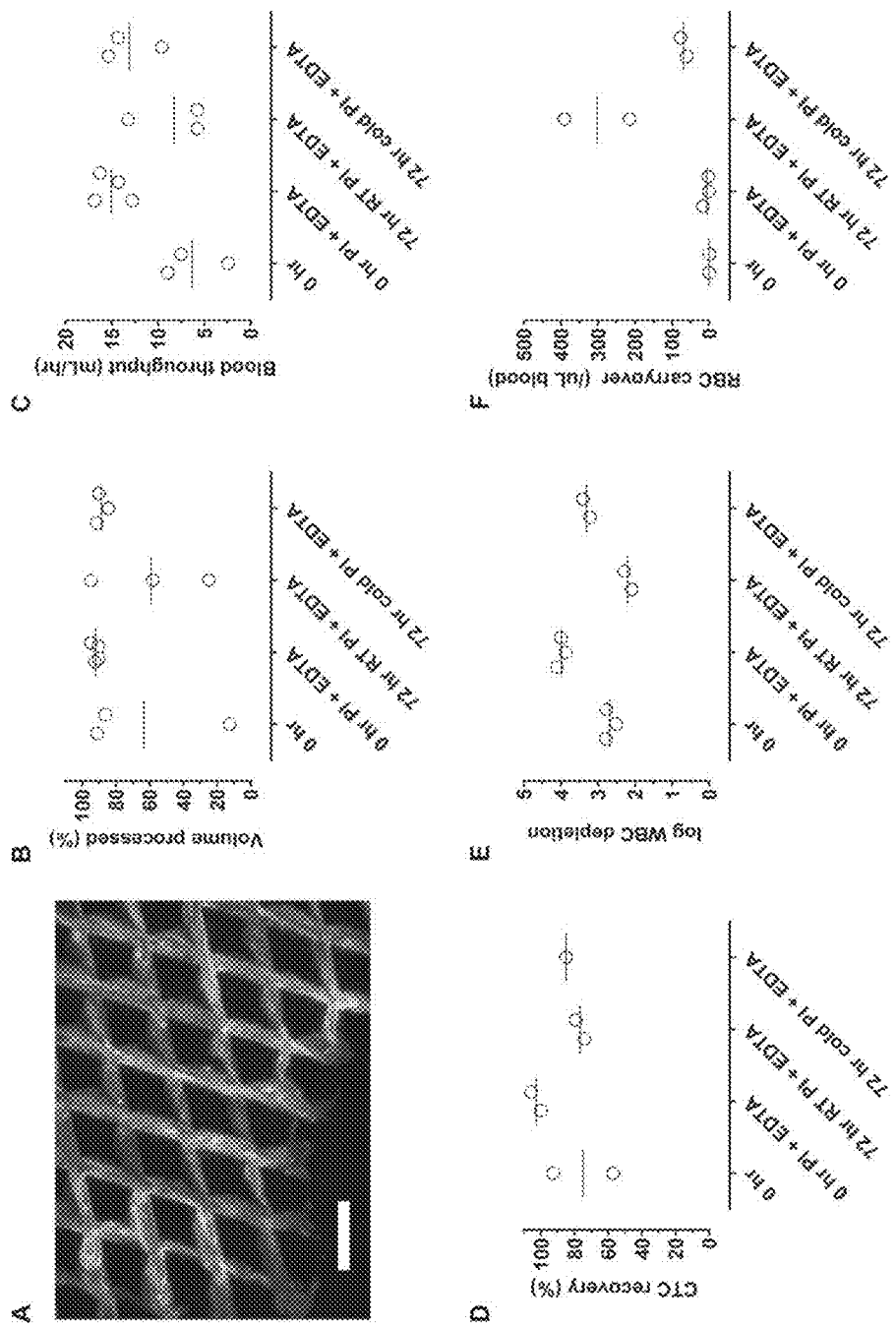
FIGS. 17A-17F. Processing of cold stored blood through the CTC-iChip. Platelet inhibitors enabled CTC-iChip processing of both fresh blood and blood that was stored for 3 days under hypothermic temperature (4° C.). Here, platelet inhibitors (PI) used was either 0.5 μg/mL tirofiban, or 1 μg/mL tirofiban+eptifibatide 20 μg/mL (added before storage). EDTA (2-5 mM) was added to blood samples 15 minutes prior to iChip processing.

Using imaging flow cytometry, we measured the viability of cold versus room temperature stored rare cancer cells using live (calcein blue) and dead (caspase 3/7) stains. The data showed (see FIG. 16) that the viability of rare cells stored in the cold was possibly better than room temperature stored blood. The addition of the platelet inhibitor cocktail has no effect on rare cell viability. These trends were observed in healthy donors and cancer patients Example 3.9 Processing of Cold Stored Blood Through the CTC-iChip Platelet inhibitors enabled CTC-iChip processing of both fresh blood and blood that was stored for 3 days under hypothermic temperature 4° C. Here, the platelet inhibitor (PI) used was either 0.5 µg/mL tirofiban, or 1 µg/mL tirofiban+eptifibatide 20 µg/mL. EDTA (2-5 mM) was added to blood samples 15 minutes prior to iChip processing. The results showed the following:

Clogging of the iChip in the absence of platelet inhibitors or as a result of storage for 72 hours in room temperature (RT) led to severe clogging in the first stage of the filtration array. The image in FIG. 17A shows fluorescence staining of DNA by Vybrant DyeCycle Green (Life Technologies) which illustrates cells trapping in the clog. Scale bar represents 100 µm.

Clogging of the iChip led to a drastic decrease in the amount of blood that could be processed; see FIG. 17B. The plot illustrates the blood volume that was processed as a percentage of the target volume (5-6 mL). In the presence of platelet inhibitors and EDTA, ~90% of blood volume could be processed; the residual volume losses was attributed to sample transfer and dead volumes in tubing and is standard in microfluidic chips.

Clogging also severely decreased the flow rate, or throughput, of the CTC-iChip (FIG. 17C).

The recovery of spiked cells post iChip sorting, calculated based on the actual processed volume, is shown in FIG. 17D. In the absence of platelet inhibitors or after storage in RT, a substantial fraction of spiked cells was lost and not recoverable in the enriched product. Note that this recovery percentage is only based on the processed blood volume, which was greatly decreased in the event of chip clogging shown in (FIG. 17B). The absolute recovery of CTCs was therefore much lower and could be calculated by the recovery percentage×volume processed.

The log-transformed fold depletion of leukocytes by the iChip is shown in FIG. 17E. The higher the depletion, the more pure the enriched CTC population. To put numbers into perspective, a depletion of 4 log translates to 10000-fold depletion, which means that a typical blood sample containing $5 \times 10^6$ leukocytes/mL of blood would leave only 500 leukocytes/mL of blood processed in the enriched CTC product. The use of platelet inhibitors and EDTA greatly improved depletion, presumably by preventing platelet-leukocyte interaction (FIG. 12) and thereby allowing access of leukocyte-depletion antibodies. Blood stored for 72 hours in room temperature also suffered from low depletion, possibly as a result of leukocyte degradation (FIG. 15).

FIG. 17F shows carryover of red blood cells (RBC)/μL, of blood into the CTC product. Room temperature-stored blood samples showed higher RBC carryover presumably due RBC degradation, which changes shape and form echinocytes (FIG. 13) and were unable to be removed effectively in the hydrodynamic sorting stage of the iChip.

Example 3.10 Culture of CTCs after iChip Sorting

Cell growth was quantified by the amount of luminescence using the Bright-Glo Luciferase Assay System. Luminescence signal was normalized to the signal at day 0 which was the day when culture was initiated immediately after iChip processing. A positive control was included without any iChip processing.

Figure 18:
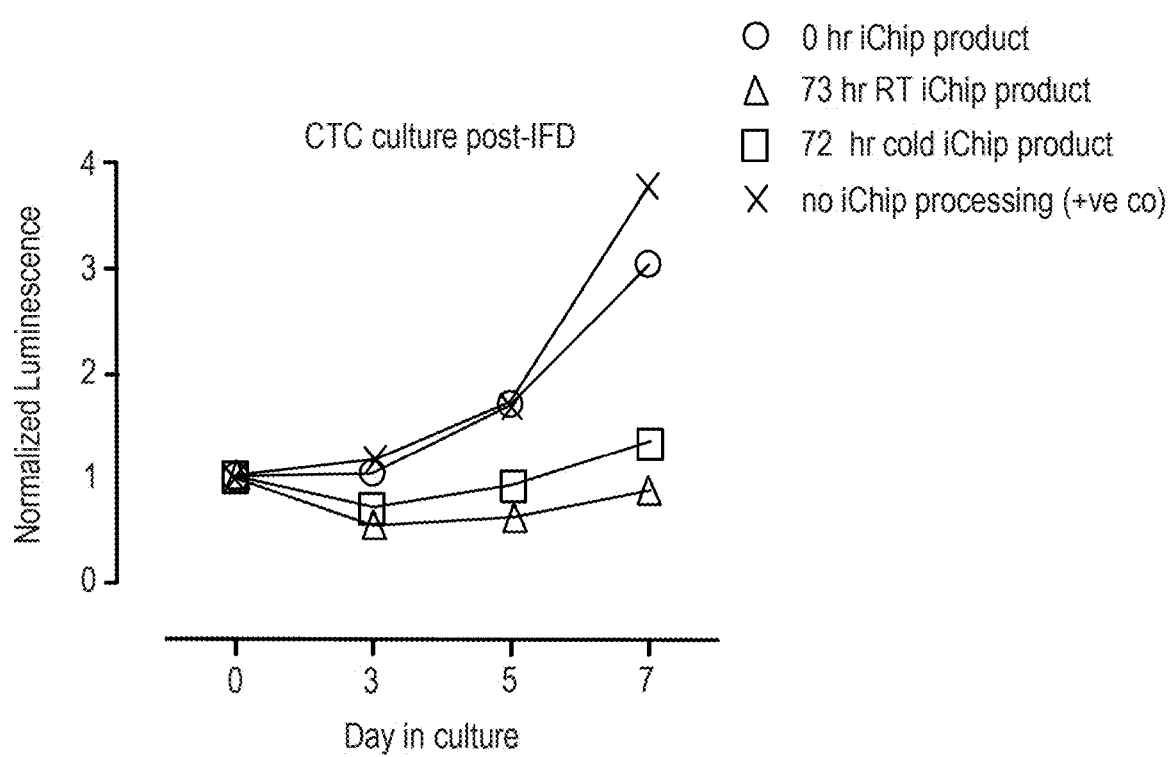
FIG. 18. Culture of CTCs after iChip sorting. Circulating tumor cells were spiked into blood (2000-5000 cells/mL) and enriched by the CTC-iChip. CTCs collected from the iChip product were plated and cultured. Cell growth was quantified by the amount of luminescence using the Bright-Glo Luciferase Assay System. Luminescence signal was normalized to the signal at day 0 which was the day when culture was initiated immediately after iChip processing. A positive control was included without any iChip processing.
Figure 19:
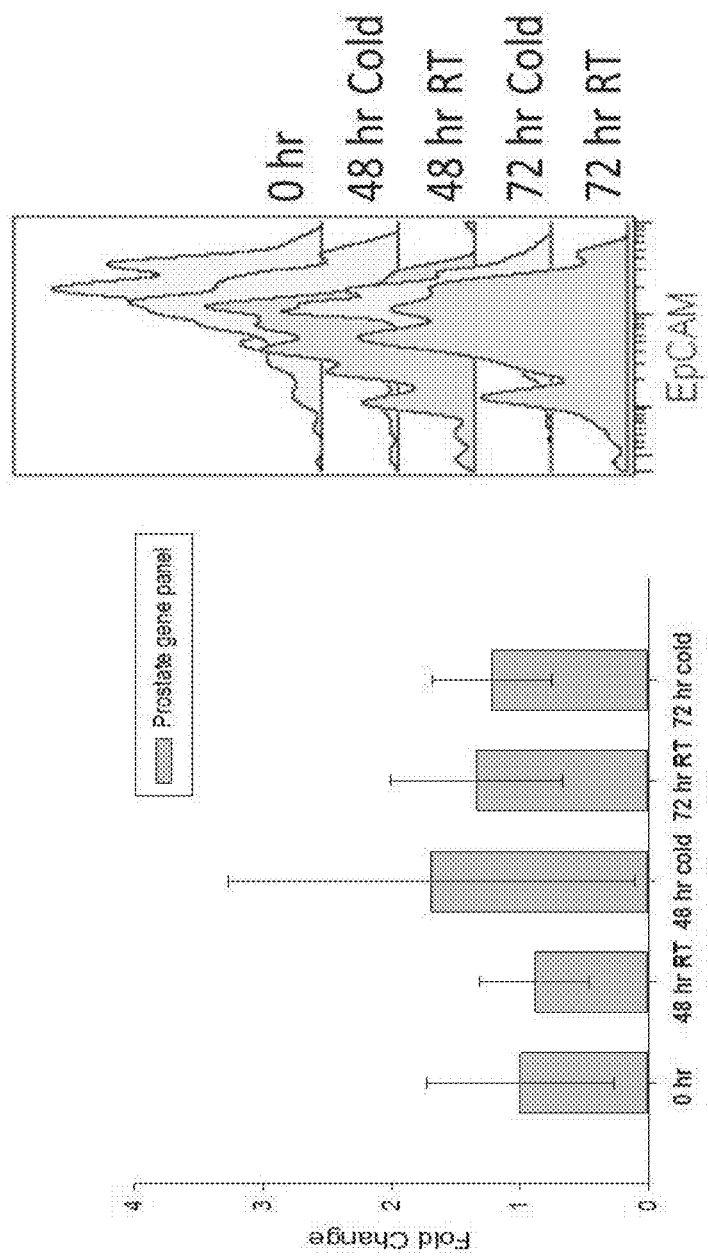
FIG. 19. Single-cell PCR (left) and mass cytometry after iChip sorting. (Left) LNCaP cells were spiked into blood (2000 cells/mL), isolated by the iChip, and micromanipulated for single-cell transcriptional profiling (ref. 30, Ozkumur 2013 Sci Transl Med). Data shown represents the average expression of genes specific to prostate cancer. In each storage condition, 4 cells were selected at random and profiled. (Right) Mass cytometry of the enriched iChip product from the same experiments with LNCaP cells. The expression of epithelial cell adhesion molecule (EpCAM) was better preserved in cold storage compared to room temperature.

As shown in FIG. 18, CTCs sorted from a fresh blood sample (0 hr) in the presence of platelet inhibitors exhibited growth rates almost identical to the positive control, suggesting that the microfluidic processing and treatment with platelet inhibitors and EDTA were non-toxic to CTCs. After the spiked blood sample was stored for 72 hours in 4° C., CTCs could be sorted and re-cultured in vitro, although there was a slight delay in re-initiating proliferation. CTCs obtained from a blood sample stored for 72 hours in room temperature showed a decreased ability to proliferate after sorting, as compared to CTCs stored at 4° C.

REFERENCES

1. Toner M, Irimia D. 2005. Blood-on-a-chip. Annu. Rev. Biomed. Eng. 7:77-103
2. Cheng X, Irimia D, Dixon M, Sekine K, Demirci U, et al. 2007. A microfluidic device for practical label-free cd4(+) t cell counting of hiv-infected subjects. *Lab Chip.* 7(2):170-78
3. Zhu H, Stybayeva G, Macal M, Ramanculov E, George M D, et al. 2008. A microdevice for multiplexed detection oft-cell-secreted cytokines. *Lab Chip.* 8(12):2197-2205
4. Kotz K T, Xiao W, Miller-Graziano C, Qian W-J, Russom A, et al. 2010. Clinical microfluidics for neutrophil genomics and proteomics. *Nat. Med.* 16(9):1042-47
5. Stephens M, Talary M S, Pethig R, Burnett A K, Mills K I. 1996. The dielectrophoresis enrichment of cd34+ cells from peripheral blood stem cell harvests. *Bone Marrow Transplant.* 18:777-82
6. Huang R, Barber T a, Schmidt M a, Tompkins R G, Toner M, et al. 2008. A microfluidics approach for the isolation of nucleated red blood cells (nrbcs) from the peripheral blood of pregnant women. *Prenat. Diagn.* 28(10):892-99
7. Nagrath S, Sequist L V, Maheswaran S, Bell D W, Irimia D, et al. 2007. Isolation of rare circulating tumour cells in cancer patients by microchip technology. *Nature.* 450 (7173):1235-39
8. Maheswaran S, Sequist L V, Nagrath S, Ulkus L, Brannigan B, et al. 2008. Detection of mutations in egfr in circulating lung-cancer cells. *N Engl. J. Med.* 359(4):366-77
9. Hardwick J. 2008. Blood processing. ISBT Sci. Ser. 3:148-76
10. Huestis D W, Glasser L. 1994. The neutrophil in transfusion medicine. *Transfusion.* 34(7):630/6
11. Arrington P J, McNamara J J. 1975. Effect of agitation on platelet aggregation and microaggregate formation in banked blood. *Ann. Surg.* 181(2):243-44
12. Gervin A S, Mason K G, Buckman R F. 1978. The effect of agitation of stored human blood on microaggregate formation. *Transfusion.* 18(1):73-78
13. Miyamoto M, Sasakawa S. 1987. Studies on granulocyte preservation. iii. effect of agitation on granulocyte concentrates. *Transfusion.* 27(2):165-66
14. Afonso G, Scotto M, Renand A, Arvastsson J, Vassilieff D, et al. 2010. Critical parameters in blood processing for t-cell assays: validation on elispot and tetramer platforms. *J. Immunol. Methods.* 359(1-2):28-36
15. Brown C H, Leverett L B, Lewis C W, Alfrey C P, Hellums J D. 1975. Morphological, biochemical, and functional changes in human platelets subjected to shear stress. *J. Lab. Clin. Med.* 86(3):462-71
16. Reimers R C, Sutera S P, Joist J H. 1984. Potentiation by red blood cells of shear-induced platelet aggregation: relative importance of chemical and physical mechanisms. *Blood.* 64(6):1200-1206
17. Fuchs T a, Alvarez J J, Martinod K, Bhandari A a, Kaufman R M, Wagner D D. 2013. Neutrophils release extracellular dna traps during storage of red blood cell units. *Transfusion.* 53(12):3210-16
18. Fuchs T a, Abed U, Goosmann C, Hurwitz R, Schulze I, et al. 2007. Novel cell death program leads to neutrophil extracellular traps. *J. Cell Biol.* 176(2):231-41
19. Klopfleisch R, Weiss a T a, Gruber a D. 2011. Excavation of a buried treasure-dna, mrna, mirna and protein analysis in formalin fixed, paraffin embedded tissues. *Histol. Histopathol.* 26(6):797-810
20. Chien S, Usami S, Dellenback R J, Gregersen M I, Nanninga L B, Guest M M. 1967. Blood viscosity: influence of erythrocyte aggregation. *Science.* 157(3790): 829-31
21. Lowe G D. 1987. Blood rheology in vitro and in vivo. *Baillieres. Clin. Haematol.* 1(3):597-636
22. Neu B, Meiselman H J. 2002. Depletion-mediated red blood cell aggregation in polymer solutions. *Biophys. J.* 83(5):2482-90
23. Armstrong J K, Wenby R B, Meiselman H J, Fisher T C. 2004. The hydrodynamic radii of macromolecules and their effect on red blood cell aggregation. *Biophys. I* 87(6):4259-70
24. Jan K M, Usami S, Chien S. 1982. The disaggregation effect of dextran 40 on red cell aggregation in macromolecular suspensions. *Biorheology.* 19(4):543-54
25. Toth K, Wenby R B, Meiselman H J. 2000. Inhibition of polymer-induced red blood cell aggregation by poloxamer 188. *Biorheology.* 37(4):301-12

26. Neu B, Armstrong J K, Fisher T C, Meiselman H J. 2001. Aggregation of human rbc in binary dextran-peg polymer mixtures. *Biorheology*. 38(1):53-68
27. Schmid-Schonbein H, Gaehtgens P, Hirsch H. 1968. On the shear rate dependence of red cell aggregation in vitro. *J. Clin. Invest*. 47(6):1447-54
28. Bergan J J. 1965. Low molecular weight dextran in treatment of severe ischemia. *Arch. Surg*. 91(2):338
29. Orringer E P, Casella J F, Ataga K I, Koshy M, Adams-Graves P, et al. 2001. Purified poloxamer 188 for treatment of acute vaso-occlusive crisis of sickle cell disease: a randomized controlled trial. *JAMA*. 286(17): 2099-2106
30. Ozkumur E, Shah A M, Ciciliano J C, Emmink B L, Miyamoto D T, et al. 2013. Inertial focusing for tumor antigen-dependent and -independent sorting of rare circulating tumor cells. *Sci. Transl. Med*. 5(179):179ra47
31. Brinkmann V, Zychlinsky A. 2012. Neutrophil extracellular traps: is immunity the second function of chromatin? *J. Cell Biol*. 198(5):773-83
32. Brill A, Fuchs T A, Savchenko A S, Thomas G M, Martinod K, et al. 2012. Neutrophil extracellular traps promote deep vein thrombosis in mice. *J. Thromb. Haemost*. 10(1):136-44
33. Garcia-Romo G S, Caielli S, Vega B, Connolly J, Allantaz F, et al. 2011. Netting neutrophils are major inducers of type i ifn production in pediatric systemic lupus erythematosus. *Sci. Transt Med*. 3(73):73ra20
34. Thomas G M, Carbo C, Curtis B R, Martinod K, Mazo I B, et al. 2012. Extracellular dna traps are associated with the pathogenesis of trali in humans and mice. *Blood*. 119(26):6335-43
35. Yu M, Stott S, Toner M, Maheswaran S, Haber D a. 2011. Circulating tumor cells: approaches to isolation and characterization. *J. Cell Biol*. 192(3):373-82
36. Nicholson J K, Jones B M, Cross G D, McDougal J S. 1984. Comparison of t and b cell analyses on fresh and aged blood. *J. Immunol. Methods*. 73(1):29-40
37. De Rose R, Taylor E L, Law M G, Van Der Meide P H, Kent S J. 2005. Granulocyte contamination dramatically inhibits spot formation in aids virus-specific elispot assays: analysis and strategies to ameliorate. *J. Immunol. Methods*. 297(1-2):177-86

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method of stabilizing a sample of whole blood, the method comprising
   obtaining a sample of whole blood comprising viable, unfixed cells from a subject, and introducing the sample into a container containing an anticoagulant;
   introducing to the sample a preservative formulation that comprises 24-48 mM HEPES, 0.11-0.44 mM adenine, 2.25-6.75 mM mannitol, 0.39-1.54 mM N-acetyl-L-cysteine, 0-13.5 mM dextrose, and 0-17 mM NaCl;
   introducing to the sample a caspase inhibitor, a platelet inhibitor, or both a caspase inhibitor and a platelet inhibitor; and
   maintaining the sample of whole blood at 2-25° C. for at least 24 hours, thereby stabilizing the viable, unfixed cells in the sample of whole blood.
2. The method of claim 1, further comprising adding a Ficoll® polymer to the sample of whole blood.
3. The method of claim 2, wherein the Ficoll® polymer comprises is Ficoll® 70 and is added to produce a concentration of at least 10% Ficoll® 70 in the sample of whole blood.
4. The method of claim 1, wherein a caspase inhibitor is added to the sample of whole blood, and wherein the caspase inhibitor is selected from the group consisting of Q-VD-OPh ((3 S)-5-(2,6-difluorophenoxy)-3-[[(2 S)-3-methyl-2-(quinoline carbonylamino)butanoyl]amino]-4-oxopentanoic acid), Z-VAD-FMK (methyl (3S)-5-fluoro [[(2S)-2-[[(2S)-3-methyl-2-(phenylmethoxycarbonylamino)butanoyl]amino]propanoyl]amino]-4-oxopentanoate), Q-VD(OMe)-OPh ((S)-methyl 5-(2,6-difluorophenoxy)-3-((S)-3-methyl (quinoline-2-carboxamido)butanamido)-4-oxopentanoate), or Boc-D-fmk (methyl 5-fluoro-3-[(2-methylpropan-2-yl)oxycarbonylamino]-4-oxopentanoate).
5. The method of claim 1, wherein sufficient caspase inhibitor is added to the sample of whole blood to achieve a final concentration of 2-10 μM.
6. The method of claim 1, wherein the preservative formulation comprises 48 mM HEPES, 0.44 mM adenine, 6.75 mM mannitol, 0.77 mM N-acetyl-L-cysteine, and 8.5 mM NaCl.
7. The method of claim 1, wherein a platelet inhibitor is introduced to the sample of whole blood.
8. The method of claim 7, wherein the platelet inhibitor is selected from the group consisting of ticagrelor, cilostazol, prasugrel, dipyridamole, prasugrel, Tirofiban, eptifibatide, clopidogrel, or KF38789.
9. The method of claim 1, wherein a platelet inhibitor is added to the sample of whole blood to achieve a final concentration of from 0.01-100 μg/mL.
10. The method of claim 1, wherein the sample of whole blood is stored at 4° C.
11. The method of claim 9, wherein the platelet inhibitor is added to the sample of whole blood to achieve a final concentration of from 0.01-0.5 μg/mL.
12. The method of claim 1, further comprising incubating the sample of whole blood with adenosine.

* * * * *

UNITED STATES PATENT AND TRADEMARK OFFICE
CERTIFICATE OF CORRECTION

PATENT NO. : 11,612,163 B2
APPLICATION NO. : 16/937528
DATED : March 28, 2023
INVENTOR(S) : Rebecca Sandlin et al.

It is certified that error appears in the above-identified patent and that said Letters Patent is hereby corrected as shown below:

In the Claims

In Column 28, Line 19, Claim 3, delete "comprises is" and insert -- is --

In Column 28, Line 25, Claim 4, delete "((3 S)-" and insert -- ((3S)- --

In Column 28, Line 25, Claim 4, delete "-[[(2 S)-" and insert -- [[(2S)- --

In Column 28, Line 25-26, Claim 4, delete "(quinolone carbonylamino)" and insert -- (quinolone-2-carbonylamino) --

In Column 28, Line 29 (approx.), Claim 4, delete "3-methyl" and insert -- 3-methyl-2- --

In Column 28, Line 44, Claim 8, "cilostazol, prasugrel, dipyridamole, prasugrel, Tirofiban" and insert -- cilostazol, dipyridamole, prasugrel, Tirofiban --

Signed and Sealed this
Third Day of October, 2023

Katherine Kelly Vidal
*Director of the United States Patent and Trademark Office*